(12) United States Patent
Taylor et al.

(10) Patent No.: US 8,831,754 B2
(45) Date of Patent: Sep. 9, 2014

(54) EVENT PREDICTION USING HIERARCHICAL EVENT FEATURES

(75) Inventors: Michael J. Taylor, Cambridge (GB); Vishwa Vinay, Cambridge (GB); Yauhen Shnitko, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/608,714

(22) Filed: Sep. 10, 2012

(65) Prior Publication Data

US 2013/0006900 A1    Jan. 3, 2013

Related U.S. Application Data

(63) Continuation of application No. 12/817,577, filed on Jun. 17, 2010, now Pat. No. 8,265,778.

(51) Int. Cl.
*G06F 19/00* (2011.01)
*G06F 17/30* (2006.01)

(52) U.S. Cl.
CPC .... *G06F 17/30958* (2013.01); *G06F 17/30867* (2013.01)
USPC ............................... 700/37; 706/21; 709/225

(58) Field of Classification Search
CPC .............. G06Q 10/00; G06Q 30/0241; G06Q 30/2077; H04L 97/22; H04L 29/06; H04L 67/306
USPC ........... 700/37–43; 706/21, 10; 709/225, 223; 707/688; 705/14.46, 10, 2, 1.1
See application file for complete search history.

(56) References Cited

U.S. PATENT DOCUMENTS

| | | | |
|---|---|---|---|
| 6,317,761 B1 * | 11/2001 | Landsman et al. | 715/205 |
| 6,484,203 B1 * | 11/2002 | Porras et al. | 709/224 |
| 6,883,148 B1 | 4/2005 | Teig et al. | |
| 6,947,935 B1 | 9/2005 | Horvitz et al. | |
| 7,103,524 B1 * | 9/2006 | Teig et al. | 703/14 |
| 7,155,663 B2 * | 12/2006 | Landsman et al. | 715/200 |
| 7,318,056 B2 * | 1/2008 | Taniguchi et al. | 709/219 |
| 7,565,334 B2 | 7/2009 | Rifkin et al. | |
| 7,607,169 B1 * | 10/2009 | Njemanze et al. | 726/22 |
| 7,860,870 B2 * | 12/2010 | Sadagopan et al. | 707/748 |

(Continued)

OTHER PUBLICATIONS

Atrey et al., Audio Based Event Detection for Multimedia Surveillance, 2006, IEEE, p. V-813-V816.*

(Continued)

*Primary Examiner* — Kidest Bahta
(74) *Attorney, Agent, or Firm* — Pablo Tapia; Jim Ross; Micky Minhas

(57) ABSTRACT

Event prediction using hierarchical event features is described. In an embodiment a search engine monitors search results presented to users and whether users click on those search results. For example, features describing the search result events are universal resource locator prefix levels which are inherently hierarchically related. In an embodiment a graphical data structure is created and stored and used to represent the hierarchical relationships between features. An online training process is used in examples which enables knowledge to be propagated through the graphical data structure according to the hierarchical relations between features. In an example, the graphical data structure is used to predict whether a user will click on a search result and those predictions are used by the search engine to rank search results for future searches. In another example the events are advertisement impressions and the predictions are used by an online advertisement system.

20 Claims, 15 Drawing Sheets

(56) References Cited

U.S. PATENT DOCUMENTS

| | | | |
|---|---|---|---|
| 7,941,525 B1* | 5/2011 | Yavilevich | 709/224 |
| 8,015,604 B1* | 9/2011 | Tidwell et al. | 726/22 |
| 2003/0005038 A1 | 1/2003 | Codella et al. | |
| 2004/0219776 A1* | 11/2004 | Park | 438/622 |
| 2004/0221191 A1* | 11/2004 | Porras et al. | 714/4 |
| 2004/0249776 A1 | 12/2004 | Horvitz et al. | |
| 2005/0131869 A1* | 6/2005 | Xie et al. | 707/3 |
| 2007/0094219 A1* | 4/2007 | Kipersztok | 706/52 |
| 2007/0244746 A1* | 10/2007 | Issen et al. | 705/14 |
| 2008/0005163 A1 | 1/2008 | Bauchot et al. | |
| 2008/0071714 A1 | 3/2008 | Menich et al. | |
| 2008/0154821 A1 | 6/2008 | Poulin | |
| 2009/0043593 A1 | 2/2009 | Herbrich et al. | |
| 2009/0106221 A1 | 4/2009 | Meyerzon et al. | |
| 2011/0313548 A1 | 12/2011 | Taylor et al. | |
| 2013/0144722 A1* | 6/2013 | Ramer et al. | 705/14.58 |

OTHER PUBLICATIONS

Bilenko, et al., "Mining the Search Trails of Surfing Crowds: Identifying Relevant Websites From User Activity", retrieved on Dec. 16, 2009 at <<http://www2008.org/papers/pdf/p51-bilenko.pdf>>, ACM, Proceedings of International World Wide Web Conference (WWW), Beijing, CN, Apr. 2008, pp. 51-60.

Chapelle, et al., "A Dynamic Bayesian Network Click Model for Web Search Ranking", retrieved on Dec. 16, 2009 at <<http://olivier.chapelle.cc/pub/DBN_www2009.pdf>>, ACM, Proceedings of International World Wide Web Conference (WWW), Madrid, ES, Apr. 2009, pp. 1-10.

Ester, et al., "Accurate and Efficient Crawling for Relevant Websites", retrieved on Dec. 16, 2009 at <<http://www.dbs.ifi.lmu.de/Publikationen/Papers/VLDB2004.pdf>>, Very Large Data Base Endowment, Proceedings of VLDB Conference, Toronto, CA, Sep. 3, 2004, pp. 396-407.

Herbrich, et al., "TrueSkill (tm): A Bayesian Skill Rating System", MIT Press, Advances in Neural Information Processing Systems 20, 2007, pp. 569-576.

Minka, et al., "Gates", MIT Press, Advances in Neural Information Processing Systems 22, 2009, pp. 1073-1080.

Richardson, et al., "Beyond PageRank: Machine Learning for Static Ranking", ACM, Proceedings of International World Wide Web Conference (WWW), Edinburgh, UK, 2006, pp. 707-715.

Stern, et al., "Matchbox: Large Scale Online Bayesian Recommendations", ACM, Proceedings of International World Wide Web Conference (WWW), Madrid, ES, Apr. 2009, pp. 111-120.

Zhang, et al., "Fast Computation of Posterior Mode in Multi-Level Hierarchical Models", Proceedings of Conference on Neural Information Processing Systems (NIPS), Vancouver, CA, Dec. 2008, pp. 1913-1920.

Zhou, et al., "Learning User Clicks in Web Search", retrieved on Dec. 16, 2009 at <<http://www.aaai.org/Papers/IJCA1/2007/IJCA107-188.pdf>>, ACM, Proceedings of International Joint Conference on Artificial Intelligence (IJCAI), Hyderabad, IN, Jan. 2007, pp. 1162-1167.

Zhu, et al., "Using Markov Chains for Link Prediction in Adaptive Web Sites", retrieved on Dec. 16, 2009 at <<http://www.springerlink.com/content/yejxyf2pat2Icwv1/fulltext.pdf>>, Springer-Verlag, Lecture Notes on Computer Science vol. 2311, Proceedings of International Conference on Soft-Ware: Computing in an Imperfect World, Belfast, IE, 2002, pp. 60-73.

* cited by examiner

EVENT PREDICTION USING HIERARCHICAL EVENT FEATURES

CROSS REFERENCE TO RELATED APPLICATIONS

This application claims priority to U.S. patent application Ser. No. 12/817,577, filed Jun. 17, 2010, now issued as U.S. Pat. No. 8,265,778, the entire contents of which are incorporated herein by reference.

BACKGROUND

Many real world systems need to be controlled by predicting events and using those predictions to adjust equipment and mechanisms of the system. For example, in order to control online information retrieval systems, online advertising systems, manufacturing plant control systems, credit card fraud detection systems, email spam detection systems and many others. Often features describing the events to be predicted are clustered hierarchically. For example, features describing events such as childhood illnesses may be clustered by families which in turn are clustered into communities. However, existing systems for predicting events and using those predictions to control systems are not easily able to take into account knowledge about hierarchical event features so that it is exploited fully and in a simple and efficient manner.

The embodiments described below are not limited to implementations which solve any or all of the disadvantages of known prediction and control systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Event prediction using hierarchical event features is described. In an embodiment a search engine monitors search results presented to users and whether users click on those search results. For example, features describing the search result events are universal resource locator prefix levels which are inherently hierarchically related. In an embodiment a graphical data structure is created and stored and used to represent the hierarchical relationships between features. An online training process is used in examples which enables knowledge to be propagated through the graphical data structure according to the hierarchical relations between features. In an example, the graphical data structure is used to predict whether a user will click on a search result and those predictions are used by the search engine to rank search results for future searches. In another example the events are advertisement impressions and the predictions are used by an online advertisement system.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an information retrieval system and an internet advertising system, the systems described are provided as examples and not a limitation. As those skilled in the art will appreciate, the present examples are suitable for application in a variety of different types of event prediction systems.

Figure 1:
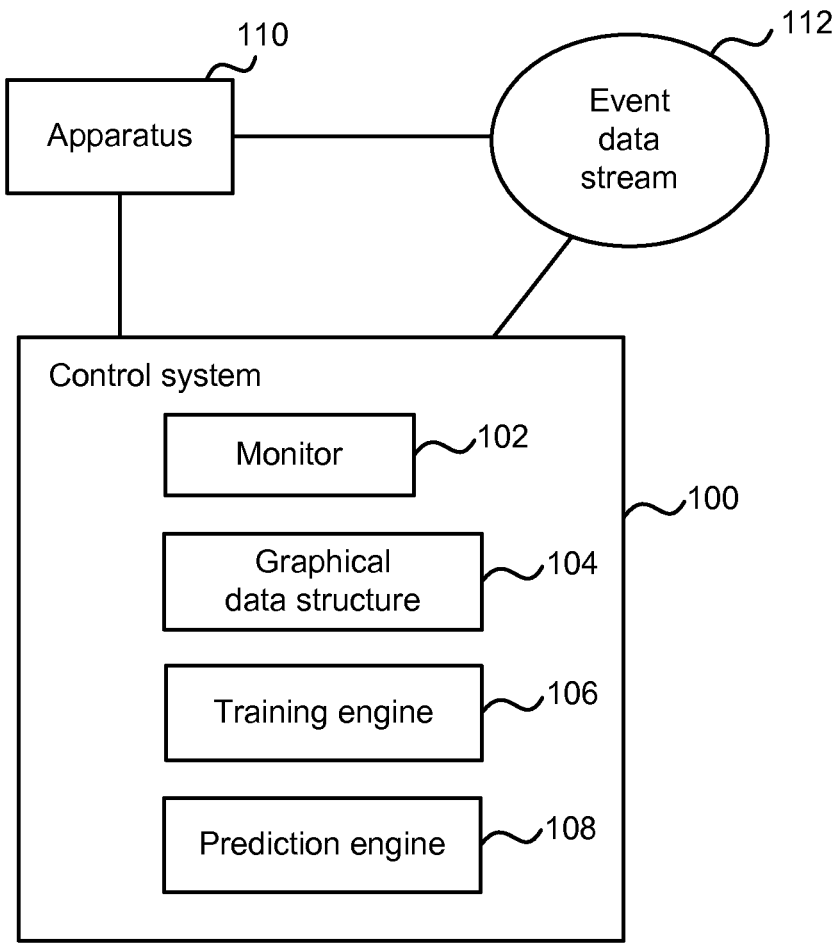
FIG. 1 is a schematic diagram of a control system for predicting events in order to control an apparatus which at least in part, influences the events.

FIG. 1 is a schematic diagram of a control system 100 for controlling an apparatus 110. The control system 100 is computer implemented and is in communication with the apparatus 110 via a communications network or link. In some cases the control system 100 is integral with the apparatus 110. The apparatus produces a stream of events 112 which have outcomes. For example, the apparatus is a search engine which produces search results in response to queries. Each time a search result is produced by the search engine and displayed at a user interface an event occurs. The outcome of the event may be whether a user clicks on the search result or not. In another example, the apparatus is an online advertising system. In this case the event stream is a sequence of advertisement impressions and the outcome of an advertisement impression event is whether a user clicks on an advertisement or not. In another example, the apparatus is an email system and the event stream is a sequence of emails sent to a particular user. The outcome of an event is whether an email is classified as junk or not. In another example the apparatus is a credit card fraud detection system and the event stream is a sequence of credit card transactions. The outcome of an event is whether a transaction is identified as being fraudulent.

The control system 100 comprises a monitor 102 for monitoring the events and the event outcomes, a graphical data structure 104 stored in memory, a training engine 106 and a prediction engine 108. The control system is arranged to provide a machine learning system which may incrementally learn from the monitored events. It may then be used to predict events and to control the apparatus 110 using those predictions.

The control system 100 is arranged to exploit knowledge about hierarchical relationships of features describing the events. This enables the control system 100 to make improved quality predictions in situations where event data is sparse (and for events which have not previously been observed) and thus to provide improved control of the apparatus 110. In addition, the control system 100 is able to exploit the knowledge about the hierarchical relationships through online or incremental learning. This enables the control system 100 to scale up successfully for use with large amounts of data. For example, the control system provides a practical solution for web-scale applications such as where the apparatus 110 is a web search engine or internet advertising system. Because the control system 100 uses a training engine 106 that does not need to revisit data it is able to scale to very large online scenarios.

The particular knowledge about hierarchical relationships between features describing events varies according to the application domain. For example, where the events are search results from a search engine the hierarchical features may be universal resource locator prefix levels. Where the events are emails the hierarchical features may be email threads, email sender identifiers, email distribution groups or other clusters of emails. Where the events are credit card transactions the hierarchical features may be times of day, calendar days, time periods, geographical locations, monetary amounts, or other clusters of credit card transaction features. In embodiments the knowledge about the hierarchical relationships is captured in an efficient manner using a graphical data structure. The knowledge may be propagated through the graphical data structure in a manner which enables the knowledge to be shared. For example, if an event is a search result which is a new web page previously unseen by the control system, then knowledge about a domain from which that web page stems may be used as evidence about the new web page. This is possible for example where the control system already has evidence about the domain from which the new web page stems.

The control system in at least some embodiments is able to use hierarchical relationships between features even when the number of levels in the hierarchy is variable. This increases the flexibility of the control system and enables it to fully exploit hierarchical relationships in event stream data. This flexibility is achieved at least in part by arranging the control system to dynamically adapt a graphical data structure that it uses.

Figure 2:
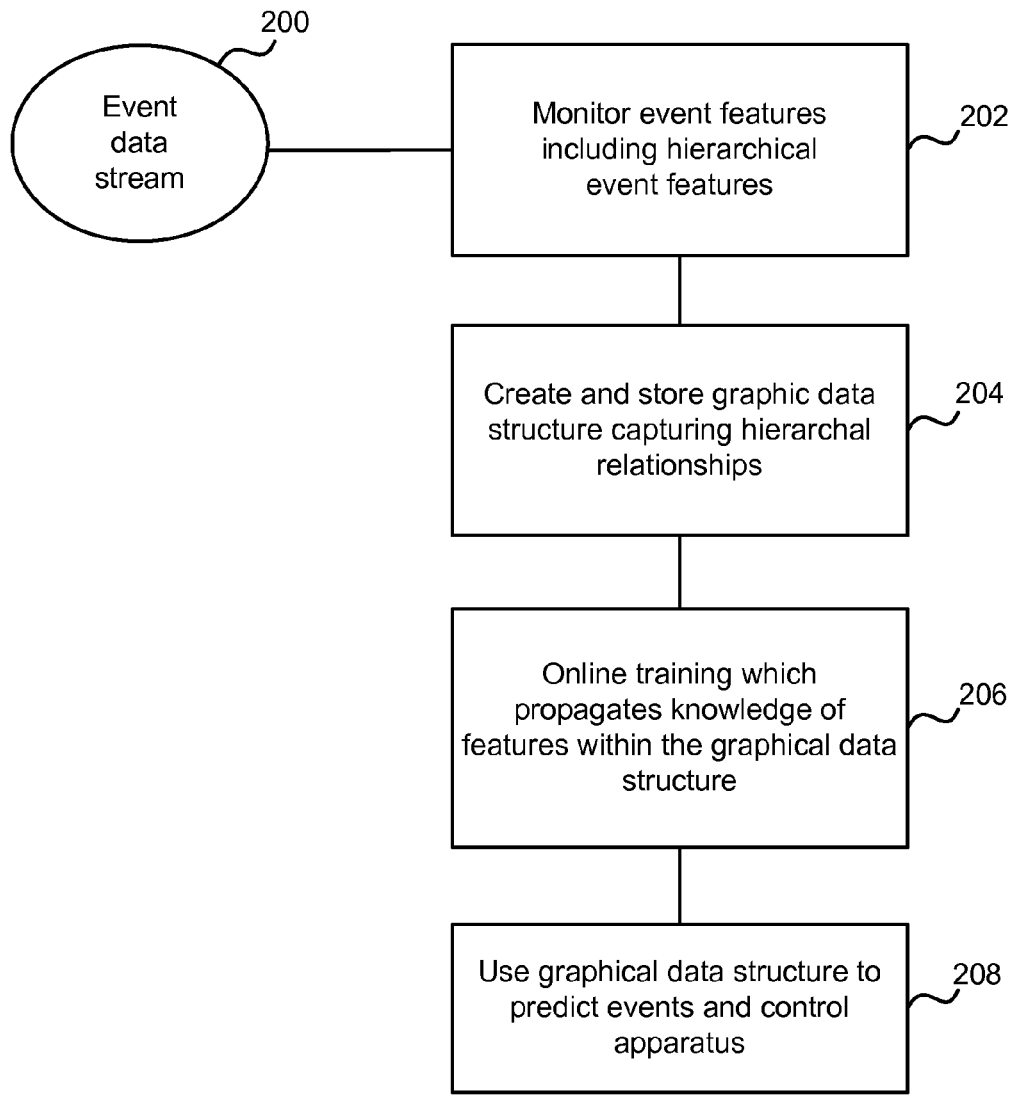
FIG. 2 is a flow diagram of a method at the control system of FIG. 1.

FIG. 2 is a flow diagram of a method at the control system of FIG. 1. An event data stream 200 is monitored and event features including hierarchical event features are detected 202. Online training is carried out 206 which propagates knowledge of the features within a graphical data structure which captures the hierarchical relationships between features. The graphical data structure is used 208 to predict events and control an apparatus.

More detail and examples of graphical data structures which may be used are given later in this document. For example, the graphical data structure is formed from variable nodes each storing statistics describing a probability distribution which represents belief about a weight associated with a feature. The weights may be updated using a Bayesian update process which is implemented by carrying out message passing between nodes in the graph.

An embodiment in which the apparatus to be controlled is an intranet search engine is now described with reference to FIGS. 3 and 4. In the field of intranet search engines web pages and other documents are typically well organized in a hierarchical, structured manner as compared with documents and web pages stored outside intranet environments. Also, event data such as user document-click-through data is often sparse for intranet search engines as compared with public domain search engine data. As a result, intranet (or Enterprise) search engines may be improved in terms of the quality of their results by exploiting the hierarchical information that is available as described herein.

Figure 3:
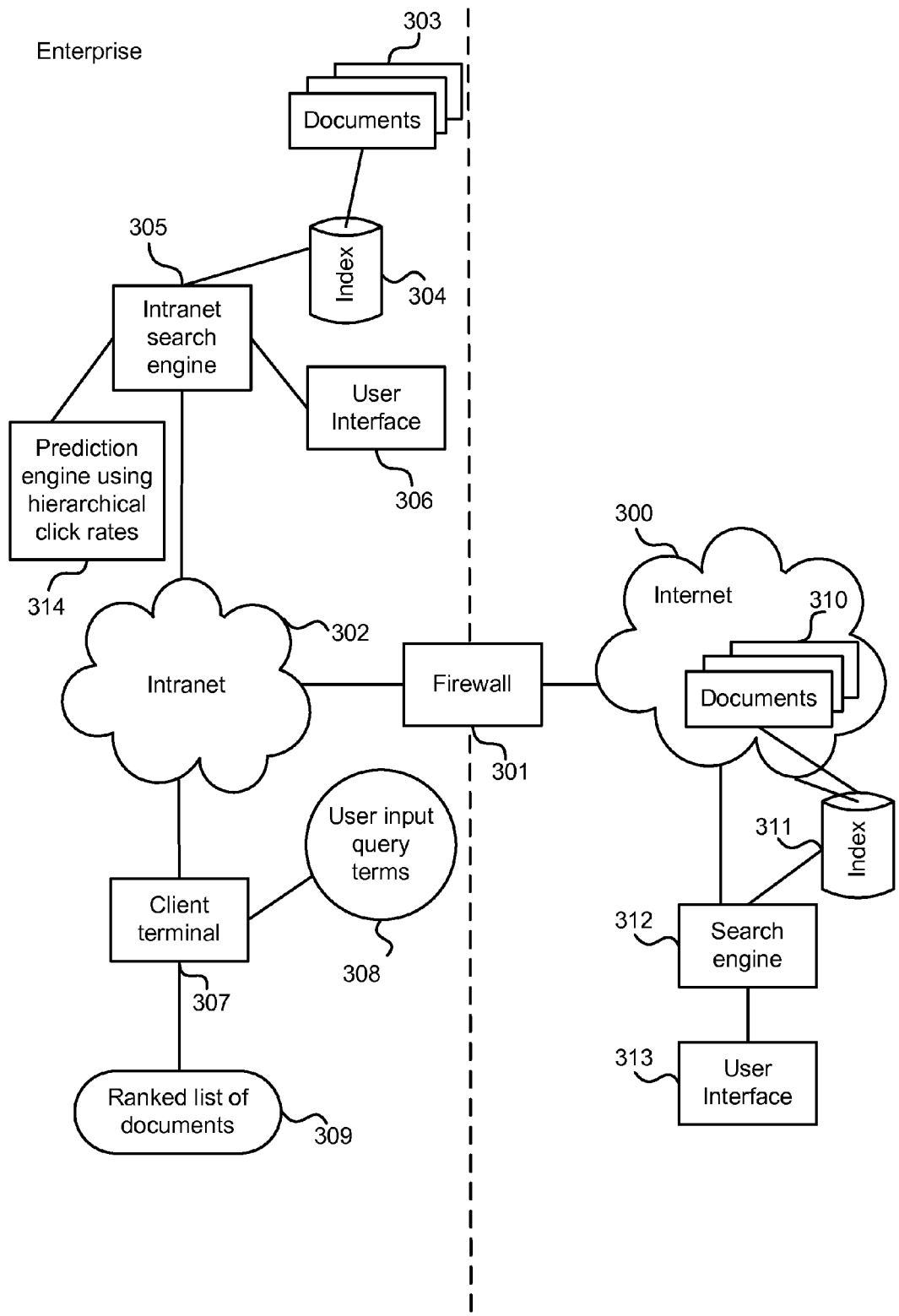
FIG. 3 is a schematic diagram of an information retrieval system incorporating a prediction engine at an Enterprise connected behind a firewall to the Internet.

FIG. 3 is a schematic diagram of an information retrieval system at an Enterprise (or other private domain) connected behind a firewall 301 to the Internet 300. The entities to the left of the dotted line in FIG. 3 are referred to herein as being part of the Enterprise domain whereas those to the right of the dotted line are in the public domain. A search engine 312 is provided in the public domain connected to the Internet 300 and arranged to provide a user interface 313 which can be browsed by an end user at a client terminal such as client terminal 307 in the Enterprise domain. The search engine 312 has access to an index 311 of documents 310. It is arranged to receive query terms 308 from an end user at a client terminal 307 (either in the public or private domain) and to return a ranked list of documents 309 using the index 311.

An intranet search engine 305 is also provided in the Enterprise domain and connected to an intranet 302 to which the client terminal 307 is also connected. The intranet search engine 305 has access to an index 304 of documents 303 which are available to users in the Enterprise but which are not generally available outside the Enterprise domain.

The intranet search engine 305 also provides a user interface 306 which is accessible by the client terminal 307. An end user at the client terminal 307 is able to input user query terms 308 to the Intranet search engine user interface 306 to obtain a ranked list of documents 309 from the index 304. The intranet search engine 305 uses a prediction engine 314 using hierarchical click rates to predict which of a plurality of documents in the Enterprise domain the user is most likely to select and to use the prediction to present a ranked list of documents to a user. The end user is able to manually send queries to either the internet search engine 312 or the intranet search engine 305.

In this example the event data stream comprises search results found by intranet search engine 305 and user click data observed in response to the search results. Each event may be described by a plurality of features. Some of these features exhibit inherent hierarchical relationships. For example, a web page listed in a list of search results has a web address which has a plurality of prefix levels. Each of these prefix levels may be a feature describing the event of listing that web page in a list of search results.

In the case that an event comprises presenting the following universal resource locator (URL) to a user at client terminal 307:

Searchengine.com/images/cat/food then the following URL prefix levels are possible:

Exact URL=Searchengine.com/images/cat/food
URL-1=Searchengine.com/images/cat
URL-2=Searchengine.com/images
Domain=Searchengine.com
Domain+1=Searchengine.com/images
Domain+2=Searchengine.com/images/cat If each of these URL prefix levels is used as a feature of the event there is a potential for double counting. For example the prefix levels URL-1 and Domain+2 are the same. In order to enable hierarchical feature information to be exploited appropriately without undue influence as a result of double counting, at least some of the embodiments described herein use a graphical data structure with a tree-based component for capturing the hierarchical relationships. The graphical data structure may also comprise an observation component which is non-tree-based and which is used to capture information about features which are not hierarchical. For example, these features may be content features describing content of search results presented as part of an event. Examples of content features may be whether the search result is an image, email, blog, text document, web page, or other type of document. Other examples of content features include but are not limited to: key words appearing in the document, anchor text, size of the document.

In an example, the intranet search engine 305 observes that a user at client terminal 307 clicks on the search result Searchengine.com/images/cat/food. In this case an online training process is used (as provided by the training engine 106 of FIG. 1) to update statistics stored in a graphical data structure (104 of FIG. 1) in respect of each of the following features:

Exact URL=Searchengine.com/images/cat/food
URL-1=Searchengine.com/images/cat
URL-2=Searchengine.com/images
Domain=Searchengine.com If another event were observed for an event presenting the search result Searchengine.com/images then a click on that result would update each of the following features:

Searchengine.com/images
Searchengine.com

The online training process is also arranged to enable propagation of knowledge within the graphical data structure. For example, if an event occurs whereby a new web page is presented as a search result then knowledge about URL prefix levels of that new web page may influence features of the new web page. This is described in more detail below.

Figure 4:
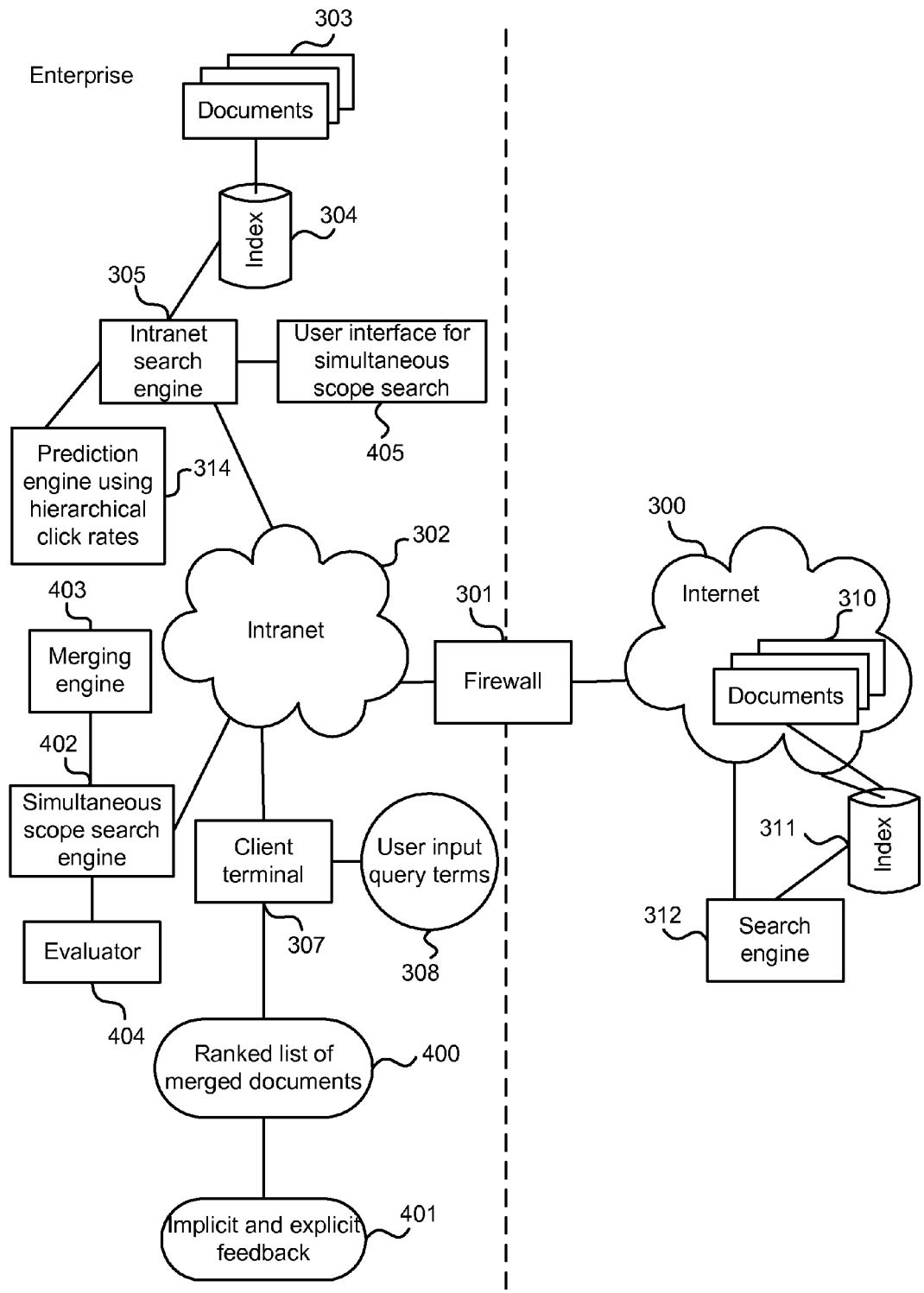
FIG. 4 is a schematic diagram of an information retrieval system incorporating a prediction engine and having a simultaneous scope search engine at an Enterprise which is connected to the Internet via a firewall.

A simultaneous scope search system may be provided as illustrated in FIG. 4. A simultaneous scope search engine 402 is connected to the intranet and either integral with or in communication with the intranet search engine. Integral with, or connected to the simultaneous scope search engine 402 is a merging engine 403 and an evaluator 404. The intranet search engine has a user interface for simultaneous scope search 405.

A user at a client terminal 307 is able to input user query terms 308 to the user interface for simultaneous scope search 405 and to obtain a ranked list of merged documents 400. The simultaneous scope search engine is arranged to send the query terms 308 to both the intranet search engine 305 and the intern& search engine 312 and to receive the results. It is arranged to merge the results using the merging engine 403 and display the ranked, merged results list to the end user at the user interface 405. The intranet search engine 305 uses a prediction engine 314 using hierarchical click rates to predict which of a plurality of documents in the Enterprise domain and in the public domain a user is most likely to select and to use the prediction to determine how best to merge the results and present a ranked list of documents to a user Implicit and/or explicit feedback 401 is observed at the user interface 405 and fed back to the simultaneous scope search engine. This feedback can be used to update the event prediction engine in order to produce new probabilities to update the merging engine.

Figure 5:
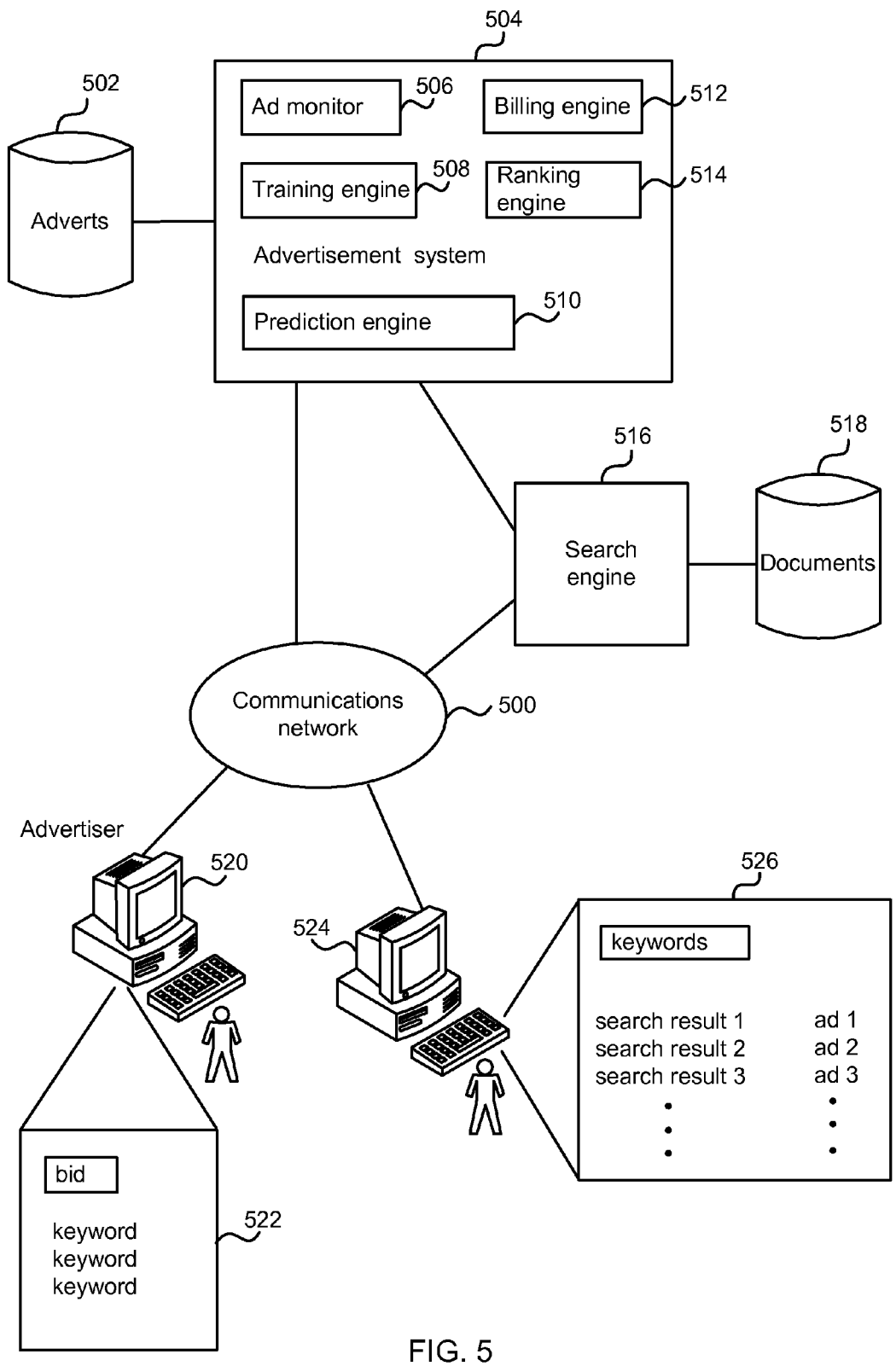
FIG. 5 is a schematic diagram of an internet advertising system having an event prediction engine.

FIG. 5 shows an example where the apparatus to be controlled is an internet advertising system 504. In this case the event data stream comprises advertisement impressions and user click data which may be monitored by a monitor 506 at the internet advertising system 504. The advertisement system 504 is arranged to select advertisements from a database of adverts 502 or other suitable source of adverts. The advertisements are selected on the basis of predicted click through rates as well as bids made by advertisers. The advertisements are to be presented to end users in conjunction with search results obtained from a search engine 516. By exploiting information about hierarchical relationships between advertisement features a prediction engine 510 at the advertisement system 504 is able to make improved click through rate predictions and hence better advertisement selections. For example the advertisement features may comprise URL prefix levels.

The advertisement system 504 comprises an advertisement monitor 506, a training engine 508, a prediction engine 510, a billing engine 512, and a ranking engine 514. The advertisement system is arranged to access a database or other store of advertisements 502 in order to select advertisements for presentation to a user. The advertisement system 504 may be connected to a search engine 516 which is arranged to retrieve documents 518 from a document database or other store.

Using a communications network 500 a user is able to access the search engine 516, for example, using a web browser or other suitable access interface. The search engine is of any suitable type arranged to rank documents from the database 518 on the basis of the relevance of those documents to user input search terms. The search engine may rank documents using any appropriate method.

In an example an advertiser at a first computer implemented device 520 may wish to purchase advertising key words. The user submits information to the advertisement system 504. The information may be an advertisement, a keyword the user is interested in bidding on or other appropriate information. The user receives a plurality of ranked advertisement keywords and is able to submit bids for the keywords. A schematic example of a user interface display 522 viewed by the advertiser is illustrated in FIG. 5.

In another example a user at a further computer implemented device 524 may use a graphical user interface 526 to submit a query to the search engine 516 in order to find relevant search results. The search engine additionally provides a list of advertisements or sponsored search results to the user as illustrated in schematic graphical user interface 526 of FIG. 5.

The advertisement system 504 stores a graphical data structure as described in more detail below. Nodes of the graphical data structure store statistics representing belief about weights associated with advertisement features. The training engine 508 uses an online training process to update the statistics as events are observed. A prediction engine 510 is then able to use the graphical data structure to predict outcomes of future advertisement impressions. Some of the advertisement features are hierarchical and this knowledge is captured in the graphical data structure as described in more detail below. Information may then be propagated between nodes in the graphical data structure to enable previously unseen advertisements, or advertisements for which there is little data, to be dealt with appropriately.

Figure 6:
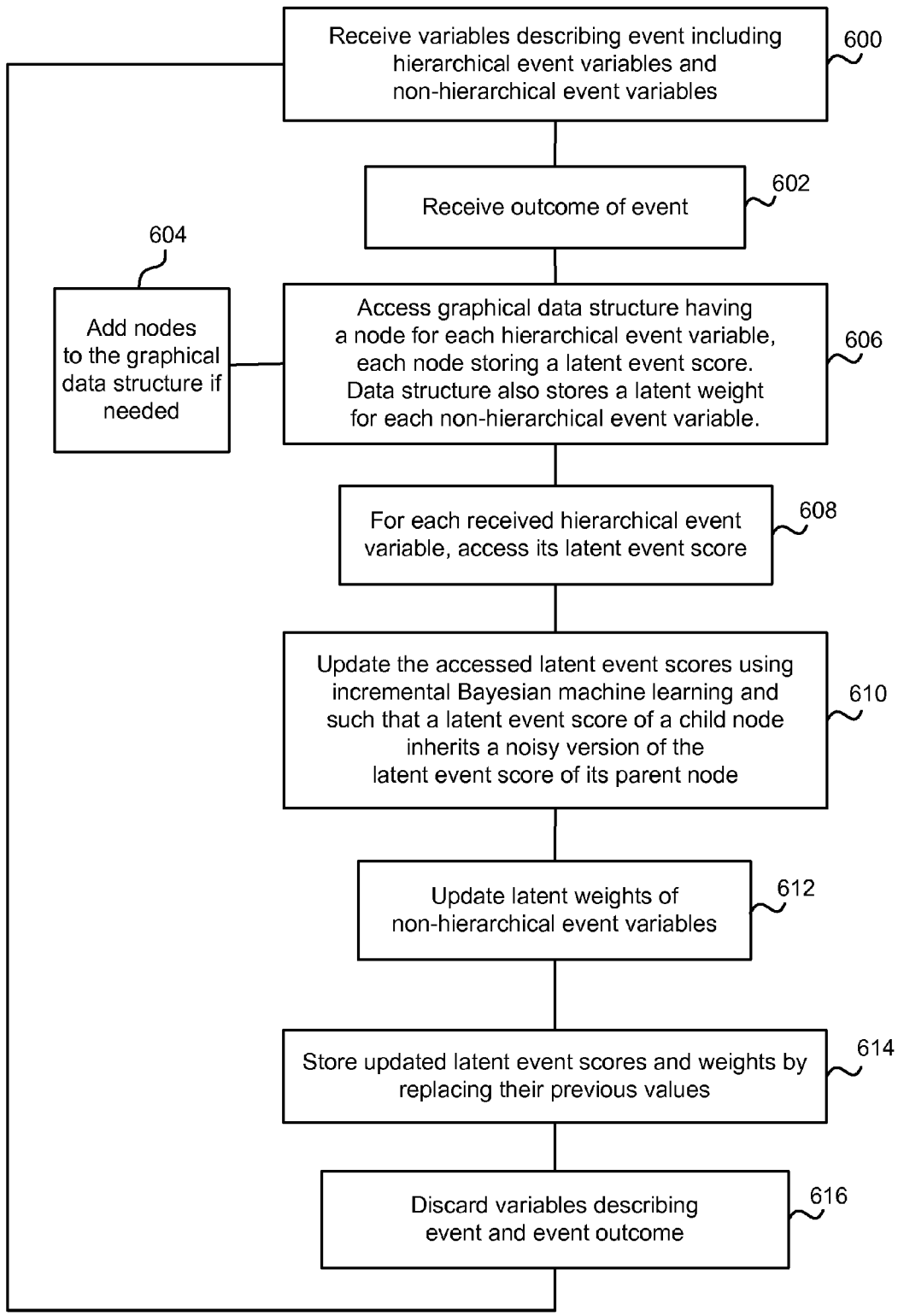
FIG. 6 is a flow diagram of a method of online training of a prediction engine.

FIG. 6 is a flow diagram of a method at a training engine such as the training engine 106 of FIG. 1. A monitor 102 of a control system receives 600 variables describing an event. These variables may be indicator variables as described below with reference to FIG. 8 although this is not essential. Some of the variables are hierarchical event variables and some are non-hierarchical event variables. For example, in the case each event is presentation of a search result from a search engine having a URL then the hierarchical event variables may be a sequence of URL prefix levels. The non-hierarchical event variables may be content features of the search result such as document type, document size. The monitor 102 also receives 602 an outcome of the event. For example, the outcome may be whether a user clicks the search result or not.

The training engine 106 accesses 606 a graphical data structure having a node for each hierarchical event variable. If needed the training engine 106 creates and stores such a graphical data structure or adds 604 nodes to an existing graphical data structure available to it. The nodes for each hierarchical event variable are connected in a manner which reflects the hierarchy. For example, a tree-based graphical data structure may be used where a node has a parent and may have one or more children. At each hierarchical event variable node a latent event score is stored. These scores are stored as statistics describing a probability distribution representing belief about a weight associated with the hierarchical feature.

In addition, the graphical data structure comprises nodes for the non-hierarchical event features. These nodes also store statistics describing a probability distribution representing belief about a weight associated with the feature. These nodes may be thought of as comprising an observation component of the graphical data structure. The nodes in this component are connected in any suitable manner which need not be tree-based.

Nodes representing noise are also added to the graphical data structure. For example, in the case that a tree-based graphical data structure is used a level noise component made be added to the graphical data structure for each level of the tree.

For each received hierarchical event variable the training engine is arranged to access 608 the latent event score from the graphical data structure. These latent event scores may be set to default values for previously unseen event features. The training engine updates 610 the accessed latent event scores using incremental Bayesian machine learning in the light of the event outcome. The update process is arranged such that a latent event score of a child node may inherit a noisy version of the latent event score of its parent node. The amount of noise to be used is specified by the level noise component at the level of the parent node. The nodes at the level noise component are themselves trained as part of the training process.

The training engine is also arranged to update 612 the latent weights of the non-hierarchical event variables. This is also achieved using incremental Bayesian machine learning for example. The updated latent event scores and weights are stored 614 by replacing their previous values. The variables describing the event and the event outcome are discarded 616 and the process repeats as indicated in FIG. 6 for the next observed event. Because the updated values replace their previous values and because some of the data is discarded after the update the training process scales up well and provides a practical solution for web-scale applications.

Figure 7:
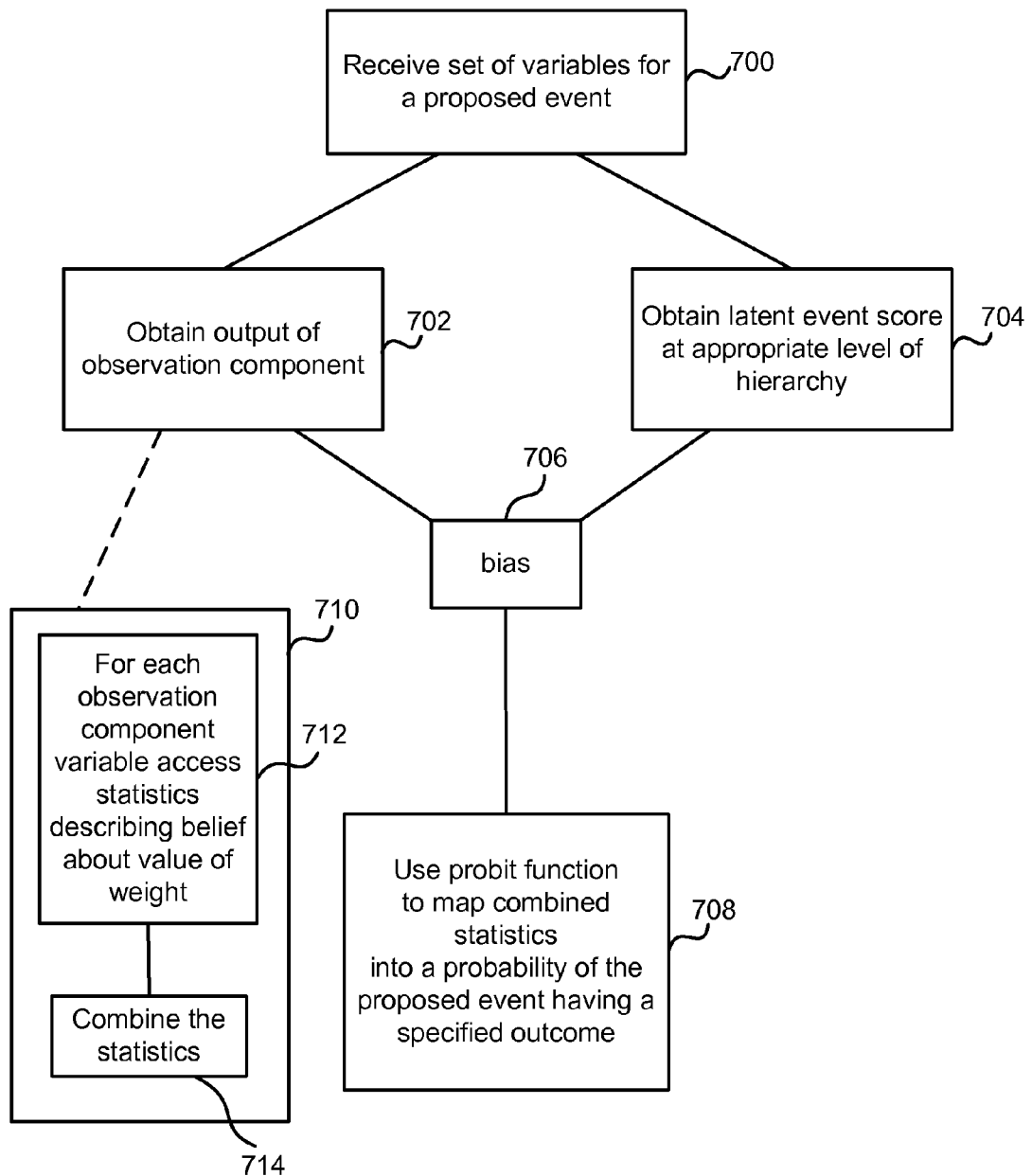
FIG. 7 is a flow diagram of a method of predicting an event using a prediction engine.

FIG. 7 is a flow diagram of a method at a prediction engine such as that of FIG. 1. A set of variables is received 700 for a proposed event. For example these variables are indicator variables for event features of a proposed event. A prediction engine is required to determine a probability that the outcome of the event will be a specified outcome. Some of the variables are hierarchical and these are used to look up in the graphical data structure and obtain 704 the latent event score at the appropriate level of the hierarchy for the feature. Others of the variables are non-hierarchical and are input to an observation component of the graphical data structure. The output of the observation component of the graphical data structure is obtained 702 and is biased 706 by the latent event score that was obtained 704. The output of the observation component of the graphical data structure comprises combined statistics from the content features and after the bias is applied 706 a probit function is used 708 to map to a probability of the proposed event having the specified outcome.

To obtain the output from the observation component 702 of the graphical data structure process 710 is followed. For each observation component variable statistics are accessed 712 describing belief about the value of a weight. These statistics are combined 714 using an inner product or in another manner.

The term "indicator variable" is used herein to refer to a variable which may take only one of two values such as 0 and 1. Each indicator variable is associated with a feature which describes or is associated with an event. In contrast, a "variable" may take any real value. For example, suppose a feature 'price' is specified. A variable associated with this feature may take any real value such as a number of cents. An "indicator variable" with this feature may take a value of say 0 or 1, to indicate for a given event, into which of a specified set of price ranges the event falls.

In the embodiments described herein a stream of event data is typically accessed and it is required to predict future items in that stream of event data. For example, the events may be advertisement impressions and the event data may be, for each event, values taken by a specified set of features for that particular advertisement impression. In the case of an advertisement impression a non-exhaustive list of examples of features is: clientIP, match type and a generalized notion of position (page number, position on page, ad count).

In the examples described herein it is possible to use a particular type of data structure to represent the event data which comprises sparse binary vectors. This is now described with reference to FIG. 8 in the case where the event data are advertisement impressions. However, this type of data structure may be used for any other types of event data. Note that it is not essential to use sparse binary vectors. In other embodiments the variables may take any real values as mentioned above.

Figure 8:
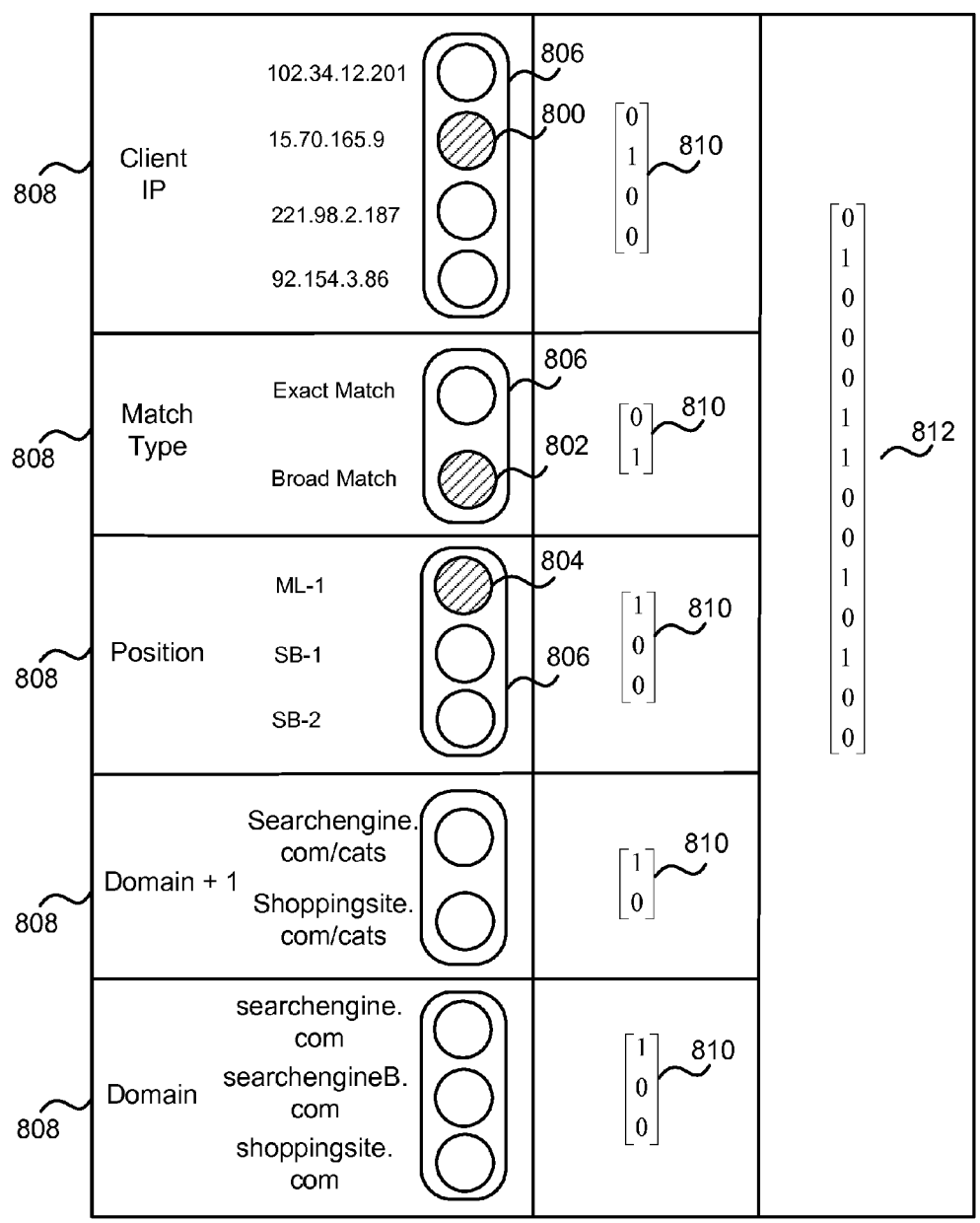
FIG. 8 is a schematic diagram of a page impression represented as a sparse binary vector.

In the example illustrated in FIG. 8 an advertisement impression was delivered to client IP 15.70.165.9 (see 800 in FIG. 1), the match type was broad 802 and the advertisement was displayed in position ML-1 (see 804 in FIG. 1). The advertisement comprises a web page with domain searchengine.com and URL prefix level domain+1 searchengine.com/cats. There are a plurality of categories 806 for each feature 808 and each feature takes only one active category for a given impression. In this way a binary indicator feature vector 810 may be obtained for each feature. The binary indicator vectors may be stacked to obtain a representation of the advertisement impression as a sparse binary vector 812.

Although a feature such as ClientIP may be able to take millions of possible feature values, for any particular advertisement impression only one of these feature values is active. In this way an advertisement impression is fully represented by a set of active values, one per feature. If there are a total of N features (in the example of FIG. 8 N=5) then an advertisement impression is described by the corresponding N feature values. A sparse binary input vector x may be obtained by stacking the N individual feature vectors as follows:

$$x = \begin{bmatrix} x_1 \\ \vdots \\ x_N \end{bmatrix}, \text{ where } x_i = \begin{bmatrix} x_{i,1} \\ \vdots \\ x_{i,M_i} \end{bmatrix}, \text{ and}$$

$$\sum_i x_{i,j} = 1 \text{ for all } i = 1, \ldots, N$$

Each feature is represented by a binary indicator vector: for the i-th feature. Each position in feature vector corresponds to one of the possible values that feature can take. All values of the vector are 0 except for the one corresponding to the active value for the current impression which is set to 1. The total number of elements of the input vector set to 1 is N.

The extreme sparsity of vector gives computational benefits. When training the model, only the fields corresponding to the N active feature values need to be updated. At prediction time, only those N fields need to be accessed. Note that identical feature representations may be used at training time and at prediction time.

Figure 9:
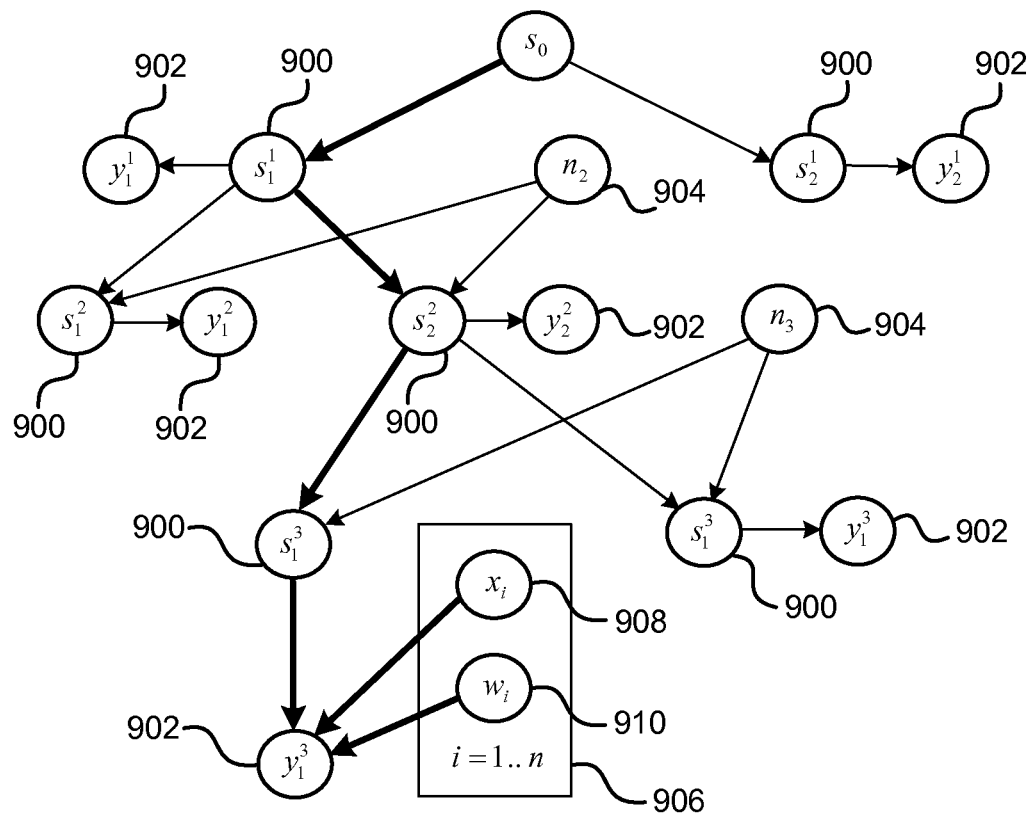
FIG. 9 is a schematic diagram of a graphical data structure for use in a control system.

More detail about a graphical data structure for use in the embodiments described herein is now given with reference to FIG. 9. The example in FIG. 9 illustrates a tree-based graphical data structure although this is not essential. Any graphical data structure may be used which is able to represent hierarchical relationships between event features.

FIG. 9 shows a plurality of nodes representing event features that are connected by edges in a hierarchical fashion. In this example, the structure is tree-based with a single root node $s_o$ that has two children $s_1^1$ and $s_2^1$ and where $s_1^1$ itself is a parent to more children and so on. In practice many more nodes and links may be present although only a small number are shown here for clarity. Each node is a variable node and stores statistics describing a probability distribution. That probability distribution represents a prediction engine's belief about a weight associated with an event feature. For example, each variable node stores statistics which describe a Gaussian distribution $s_i^l$ where l is the level in the hierarchy and i is the index of a node in a level. In an embodiment the levels of the tree may represent levels of a URL hierarchy. For example, each clickable page in a hierarchy of web pages may be represented by a path in the tree so that root node $s_o$ may represent searchengine.com, $s_1^1$ may represent searchengine.com/images, $S_2^2$ may represent searchengine.com/images/cats and $s_1^3$ may represent searchengine.com/images/cats/food. In another example, emails or credit card transaction features may be represented by paths in the tree.

The probability distribution represented by each variable node representing a hierarchical event feature is referred to herein as a latent event score s 900. Connected to each of these variable nodes is a variable node representing a Boolean observable output y 902. For example, this might be whether a web page is clicked or not. A prior probability distribution for each variable node representing a hierarchical event feature may be a noisy copy of its parent. In this way information may be propagated through the graphical data structure as explained in more detail below. A plurality of variable nodes which represent noise are incorporated into the graphical data structure. These are shown as nodes n 904 in FIG. 9 and there is one for each level in the tree although this is not essential. Other numbers and arrangements of noise nodes may be used. In an example, level dependent Gaussian noise $n_l$ is learned for each level of the hierarchical graphical data structure.

The graphical data structure comprises one or more observation components 906. An observation component itself comprises variable nodes connected by links where the variable nodes represent event features which are not hierarchically related. For example, in the case that the events are search result documents then these features may be content features describing content of those documents. Variable nodes representing belief about weights associated with those content features are also provided in the observation component. Thus each observation component comprises content feature nodes $x_i$ 908 and weight nodes $w_i$ 910. Each variable nodes of the observation component stores statistics describing a probability distribution in the same way as for the other variable nodes 900, 902.

An example method of using the graphical data structure of FIG. 9 to predict an event is now given. To generate a prior latent event score for a particular node of the graphical data structure the root score prior $s_o$ is sampled. For each variable node $s_l$ on a path l=1 ... L a child score is distributed as the sum of its parent and level noise samples $s_l = s_{l-1} + n_l$. For an event at a variable node y a binary observation is generated $y_i^l \in \{-1,1\}$. For example the binary observation may be whether a specified page is clicked or not clicked on by a user. The binary observations may be generated using a probit link function which is discussed in greater detail below. The probability of a click is the mass of the variable node greater than zero. To draw a sample click it is possible to draw from the final score variable in the path and return the sign of the sample $Y_L = \text{sign}(s_L)$.

In an example when the observed events are click rates for a URL path the non-zero mean level noise indicates that shorter URLs have a greater click rate than longer URLs. The means of these Gaussians are less than zero in general. When there are many observations at any level of the tree the observations mean that the score variables will deviate from the prior. When a large number of observations are received the accuracy of the event prediction is increased. For example where the event observations are click-through rates some nodes will have greater click rates than their content would justify. Other less popular sites where more clicks were predicted than were observed will have a score distribution with a mean that is smaller than the sum of its parent and the level noise. The hierarchical graphical data structure described herein is scalable to very large online scenarios as it does not need to re-visit data. In addition the larger the number of events that are observed the more accurate the predictions become as this will deviate the score variables from the prior.

Figure 10:
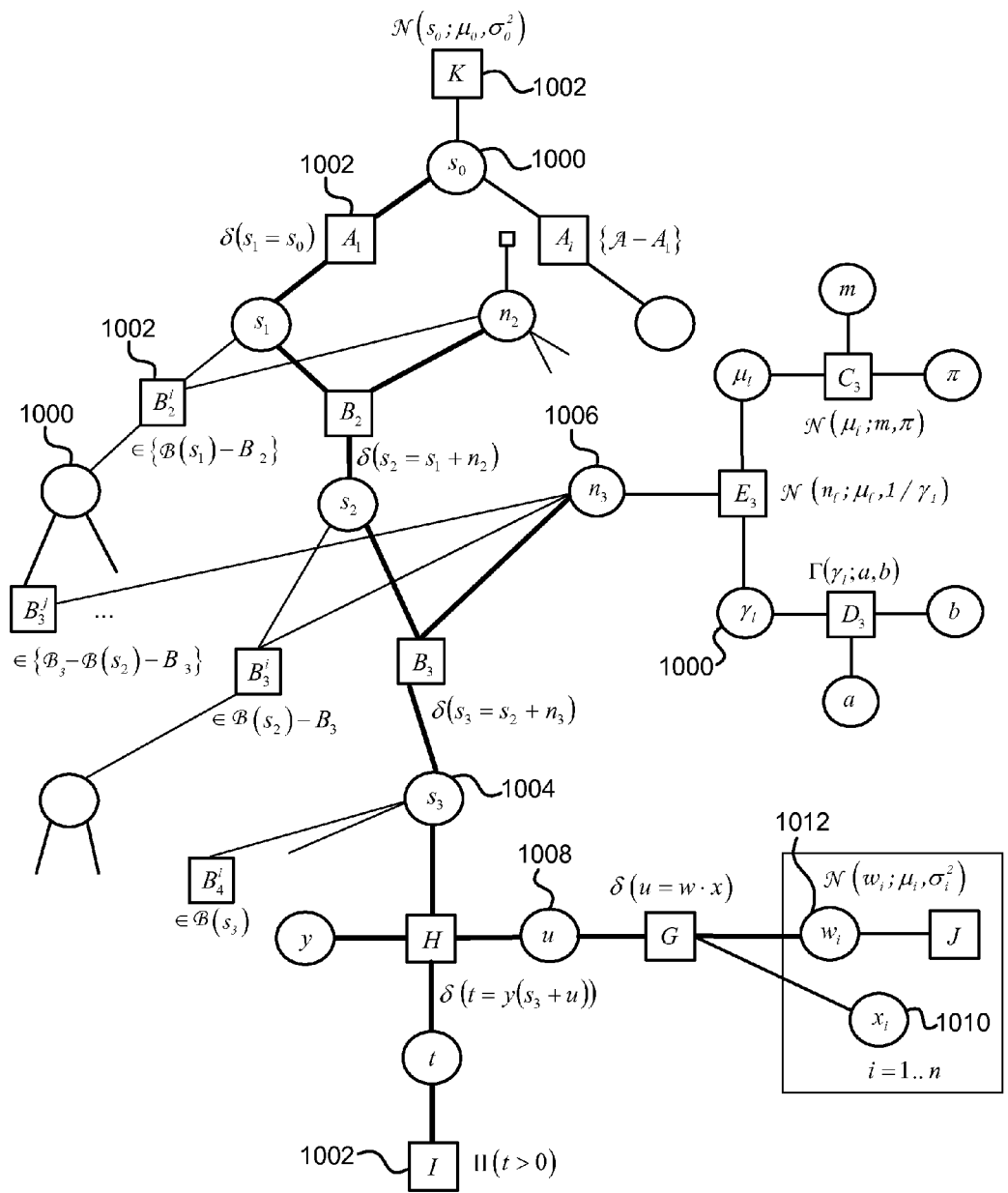
FIG. 10 is a schematic diagram of the graphical data structure of FIG. 9 with more detail.

FIG. 10 is a schematic diagram of the graphical data structure of FIG. 9 with more detail. The graphical data structure is shown as a factor graph representation. The factor graph comprises nodes connected by links. The nodes are either variable nodes 1000 (circles) or factor nodes 1002 (rectangles). Variable nodes represent storage locations and factor nodes represent computational units. The factor nodes read and write information to their neighbouring variable nodes according to calculation rules described later.

An event that is observed or for which an outcome is to be predicted may be defined in the graphical data structure by a tuple $\{x, s_0, s_1, s_2, s_3, y\}$. In this example the observed node is 1004 in FIG. 10. Messages are propagated downward through the graphical data structure according to the sequence of hierarchical nodes specified in the tuple to generate a prediction, an observation is recorded y∈{−1,1} and then the upward messages are propagated to update the graphical data structure. The factor graph components are shown expanded for the observed node 1004 and its parent noise 1006 $n_3$. A latent event score at the observed node $s_3$ 1004 serves as a bias to the output u 1008 of the observation component which in this example comprises a linear model of content features x 1010 with weights w 1012. In an example the latent event score at a node can be thought of as the residual between the observation component prediction and the actual observed click-through.

The process of message passing comprises carrying out a calculation associated with a factor node 1002 using distribution parameters from neighbouring variable nodes 1000 and passing the results to one of the neighbouring variable nodes 1000. The message can be defined as a partial joint distribution. The direction of passing the results (also referred to as a processing schedule) is explained in more detail now.

An operator proj[x] is defined as a mapping from a non-Gaussian distribution x to a Gaussian or Gamma distribution with the same mean and variance. As a result of the use of this operator many messages are Gaussian functions. Hence a message from a factor A to a variable v will often be referred to as univariate Gaussian $m_{A \to v}(V) = N(v'; \mu_{A \to v}, \sigma^2_{A \to v})$.

Figure 11:
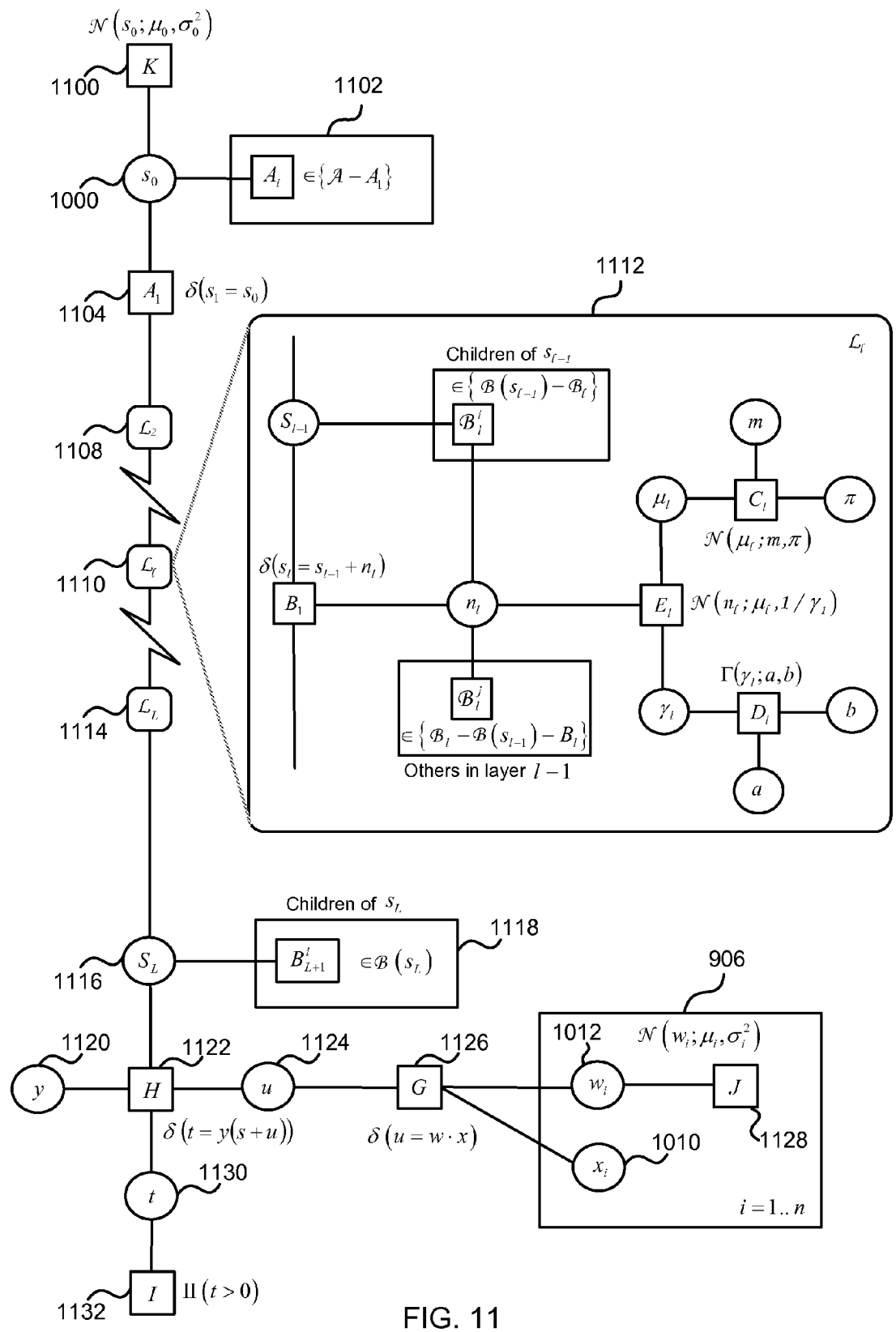
FIG. 11 is a schematic diagram of an example graphical data structure which is a factor graph.

FIG. 11 is a schematic diagram of an example graphical data structure which is a factor graph wherein an observation defines a tuple $\{y, x, s_0, \ldots, s_l, \ldots, s_L\}$. The nodes have a single subscript which describes the node level. For example, this type of graphical data structure may be formed and stored at a prediction engine in order to implement embodiments described herein.

The factor graph can be considered as comprising one or more observation components 906 (described with reference to FIG. 12), score inheritance functionality (described in more detail with reference to FIG. 13) and level noise functionality (described in more detail with reference to FIG. 14). Messages are derived for these three sub-models and given a single observation tuple a processing schedule can be obtained.

Figure 12:
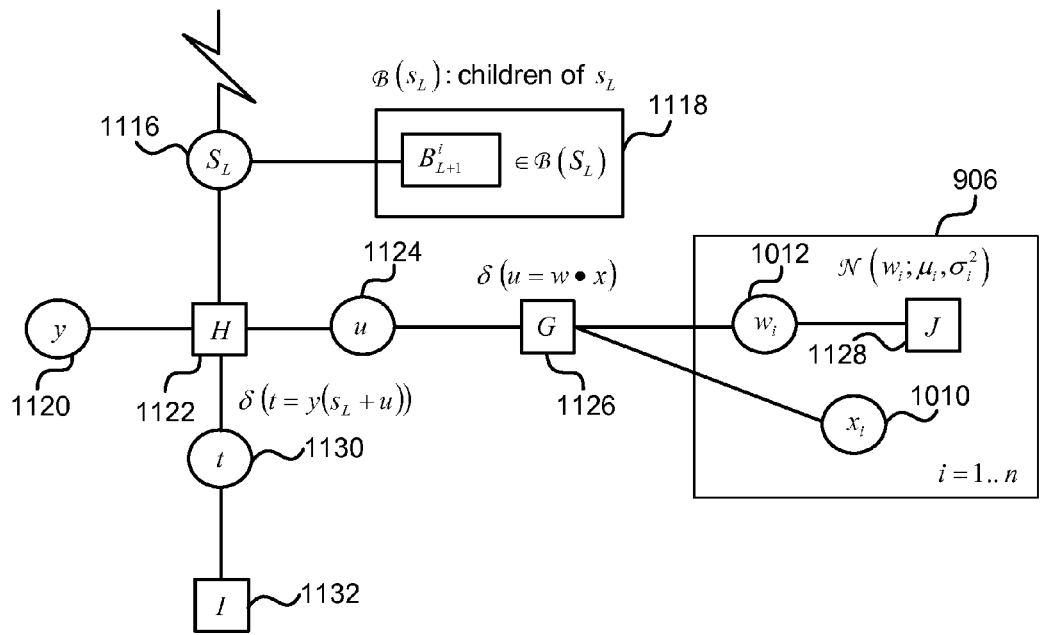
FIG. 12 is a schematic diagram of a portion of the graphical data structure of FIG. 10.

FIG. 12 shows a factor node K 1100 which reads a mean and a variance of a probability distribution representing the latent event score for root node 1000 from a database or other store. These statistics may be set to default values if the training is beginning and no updates have yet occurred. Root variable node 1000 has a plurality of children. For example, it is connected via factor node 1104 to the next level of the tree structure represented by node 1108. That is node 1108 is intended to represent a layer of the tree structure in a collapsed form for clarity. Root variable node 1000 may also be connected to other child nodes which depend from it via other factor nodes 1102. Thus other parts of the tree structure which step from root variable node 1000 are not shown for clarity but are indicated as stemming from factor nodes 1102.

The tree structure continues in this manner for more levels as indicated by nodes 1110 and 1114. The particular number of levels of the tree may vary according to the event that is observed. This is indicated by the broken continuation lines between nodes 1108 and 1110 and between 1110 and 1114. At each level of the tree a level noise component 1112 is provided. In FIG. 11 only one level noise component is shown expanded from node 1110 for clarity. In practice level noise components are formed for each level.

An observation node 1116 is connected in a chain of variable nodes from the root node 1000. For example, the observation node may represent a latent event score for a proposed event (when the graphical data structure is used for prediction). The observation node may represent a latent event score for an observed event when the graphical data structure is used for training.

The observation node 1116 has one or more children indicated in collapsed form by node 1118 in FIG. 11.

Output from the observation node 1116 is biased by output from an observation component 906 using factor node 1122. Observation component 906 comprises variable nodes 1010 representing event features and variable nodes representing belief about weights associated with those event features. Factor node 1128 reads in a mean and variance from a database or other store for each observed event feature. Factor node 1126 combines the beliefs about the feature weights from the observation component, for example, using an inner product and stores the result at variable node 1124. Variable node 1120 stores statistics describing belief about the event outcome. Factor node 1122 biases the output of the hierarchical event feature part of the data structure from node 1116 with knowledge from the observation component 906 and from the event outcome variable node 1120 and also according to a criterion specified by factor node 1132. It stores the result at variable node 1130 and messages are passed back up through the tree structure to update the variable nodes.

FIG. 12 is a schematic diagram of a portion of the graphical data structure of FIG. 11 showing how an observation component 906 is incorporated into the graphical data structure. Examples of messages that are passed from factor nodes to variable nodes in this portion of the graphical data structure are now described.

A training engine is arranged to examine one observation at a time. In this way only the weight variables $w_i$ of observation component 906 associated with observed node 1116 are obtained. A batch update with multiple observations would giver rise to simultaneous messages at many such nodes, and in this situation the weight variables would be connected to multiple places in the tree introducing many loops. Treating one observation at a time in an online fashion effectively removes these loops giving a practical scalable solution.

An example processing schedule for predicting events using the factor graph of FIG. 12 is:
click event predictions: $S_L \to H$, $J \to G \to H$, $H \to I$
For training the graphical data structure an example processing schedule for the factor graph of FIG. 12 is:
updates: $I \to H$, $H \to G \to w$, $H \to s_L$
the messages in these processing schedule are now described.

A message passed from a variable to a factor is defined by the fact that variables pass on the product of all their incoming messages from factors. A general expression for this is:

$$m_{x \to f(x)} = \prod_{i=1}^{n} m_{f_i \to x}(x) \qquad (0.1)$$

For example a message passed from a variable node x to a factor node f is the product of all the messages received at x. When the variable is a leaf node there are no incoming messages from upstream factors and n=0 in the product in (0.1). Thus the message in the leaf node case is:

$$m_{x_0 \to f}(x) = 1$$

Messages passed from factors to variables are the sum of all the variables local to the factor. When there are many variables local to the factor the message is obtained by integrating out each variable in turn. A general expression for a message passed from a factor f to variable w in terms of the upstream messages to the factor is:

$$m_{f \to w} = \sum_{x_1} \cdots \sum_{x_n} f_B(w, x) \prod_{i=1}^{n} m_{x_i \to B}(x_i) \quad (0.2)$$

When a factor is a leaf node, there are no incoming messages from upstream variables and so n=0 in the product in (0.2). Thus the message in an example of a leaf node which is a factor is:

$$m_{f_0 \to w}(w) = f_B(w, x)$$

An example of message passing between a variable and a factor is shown in FIG. 12 between observed variable node $S_L$ 1116 and factor node H 1122. Message $s_L \to H$ Applying rule (0.1) a product is taken over incoming messages to the variable node. One is from $s_L$'s 1116 upstream B-factor (in the examples herein B-factors are functions which represent how a child node inherits a noise version of its parent score, described in more detail below) and the others are from its downstream child nodes. In the equations herein B-factors that are upstream of $s_L$ 1116 are denoted by B, B-factors in a level L are denoted by $\mathcal{B}_L$ and B-factors of a child node of $S_L$ 1116 are denoted by $\mathcal{B}(s_L)$.

$$m_{s_L \to H}(s) = m_{B_L \to s_L} \prod_{B^i_{L+1} \in \mathcal{B}(s_L)} B^i_{L+1}$$

Message $J \to w_i$

In this example factor node J 1128 is a leaf node. The message $J \to w_i$ is therefore:

$$m^{J \to w}_i = N(w_i; \mu_i, \sigma_i^2)$$

Message $G \to u$

The message $G \to u$ is an example of a message passed from a factor node to a variable node as described above with reference to (0.2). $G \to u$ takes the form:

$$m_{G \to u} = N\left(u; \sum_{j=1}^{n} x_j \mu_j, \sum_{j=1}^{n} x_j^2 \sigma_j^2\right) \quad (0.3)$$

Message $u \to H$ is equivalent to message $G \to u$

Message $y \to H$

The click event occurs here, where $y \in \{-1, 1\}$ but there is no message as the click event is incorporated in the factor H.

Message $H \to t$

The message passed from factor node H 1122 to variable node t 1130 comprises the function accessed at node H and messages passed to node H from nodes $S_L$ 1116 and u 1124. Noting that $y \in \{-1, 1\}$ the message is:

$$m_{H \to t}(t) = N(t; y[\mu_{s \to H} + \mu_{G \to u}], \sigma_{s \to H}^2 + \sigma_{G \to u}^2)$$

Message $t \to I$

Because there is only one upstream factor the downstream message $t \to I$ is: $m_{t \to I}(t) = m_{H \to t}(t)$.

Passing update messages allows nodes closer to the root of the graphical data structure to be updated with information regarding events downstream.

Message $I \to t$

The message passed upstream from node I 1132 to t 1130 is described by:

$$m_{I \to t}(t) = N\left(t; \mu_{t \to I} + \frac{v \sigma_{t \to 1}}{\omega}, \sigma_{t \to 1}^2 \left[\frac{1}{\omega} - 1\right]\right)$$

where $v(z) := N(x; 0, 1)/\Phi(t; 0, 1)$ where $\Phi$ is a probability mass attributed by a Gaussian to event potential values above zero and is a probit or cumulative Gaussian function and $N(x; m, v)$ is the Gaussian distribution of a random variable x with mean m and variance v and $z = \mu_{t \to 1}/\sigma_{t \to 1}$.

Message $t \to H$

Because there is only one upstream factor the message gets passed to the H-factor 1122: $m_{t \to H}(t) = m_{I \to t}(t)$.

Message $H \to u$

Having made an observation the local weight vector is updated. Applying the factor to variable rule as in (0.2) there are two local variables to integrate out and so:

$$m_{H \to u}(u) = N(u; y \mu_{I \to t} + \mu_{s \to H}, \sigma_{I \to t}^2 + \sigma_{s \to H}^2)$$

Message $u \to G$

Message $u \to G$ is the same as message $H \to u$ above:

$$m_{u \to G}(u) = m_{H \to u}(u)$$

This is used to update the root score weight distributions at the end of a complete update cycle:

$$m_{G \to w_i} = N\left(w_i; \mu_{u \to G} - \sum_{j \neq i} x_j \mu_j, \sigma_{u \to G}^2 + \sum_{j \neq i} x_j^2 \sigma_j^2\right)$$

Message $H \to s_L$

Again applying (0.2) there are again two local variables to integrate out. Dropping the subscript of $S_L$:

$$m_{H \to s}(s) = N(s_L; y \mu_{I \to t} \to \mu_{u \to H}, \sigma_{I \to t}^2 + \sigma_{u \to H}^2)$$

When no observation is made at a node the s variable node can be thought of as a terminal node. There is no H-factor or observation messages to multiply up at the variable node. The observation sub model described in FIG. 12 is removed. This allows the approach to be adopted that only factors neighboring the "lightening bolt" from the root to the observed node in FIG. 11 are updated.

In an embodiment the outcome is not binary and a more general ordinal regression framework can be adopted. The observations do not need to be restricted to a single variable. For example when the observations are click data the binary outcomes "last click", "only click" and "examined" are useful implicit relevance signals that stop short of the complexity involved with click-chain style model. Examined can be encoded as an input. For example the number of rank positions below the last known examination, which can be defined as the last clicked rank, can be encoded and if there are no clicks on the impression list it can be assumed that the top ranked document was examined. This feature may explain many skip events on documents with ostensibly good content.

In another embodiment LastClick and OnlyClick may best be considered as outputs. The base click observation model can be extended to harness these two extra events. The variables are dependent, for example LastClick can only be true if Click is true. In this sense they represent an ordinal set. Instead of having a single fixed threshold at zero, a set is learnt. This observation model is more complex as the simplifications from the fact that $y \in \{-1, 1\}$ no longer apply.

In another embodiment complex prediction based upon joint click events for an impression list can be considered.

Returning to FIG. 11 it can be seen that a B-factor is where the level noise variable is added to a parent node score distribution to generate a prior child node distribution. For the example described in FIG. 11 there are four classes of B-factor sets when considering an update for a specific score variable:

1. $B_l$ the unique parent of $s_l$ and a child of $s_{l-1}$
2. $B_l^i$:$B_l^i \in \{B(s_{l-1})-B_l\}$ B-factor children of $s_{l-1}$ sharing the same variable parent $s_{l-1}$ with $B_l$. These factor nodes share the same noise level and s-variable nodes.
3. $B_l^i$:$B_l^i \in \{B_l-B(s_{l-1})-B_1\}$ B-factor children of s-variable nodes in the same level as $s_{l-1}$. These B-factors only share the level-noise variable.
4. $B_{L+1}^i$ 1118: $B_{L+1}^i \in \mathcal{B}(S_L)$ child B-factors of the observed node.

Figure 13:
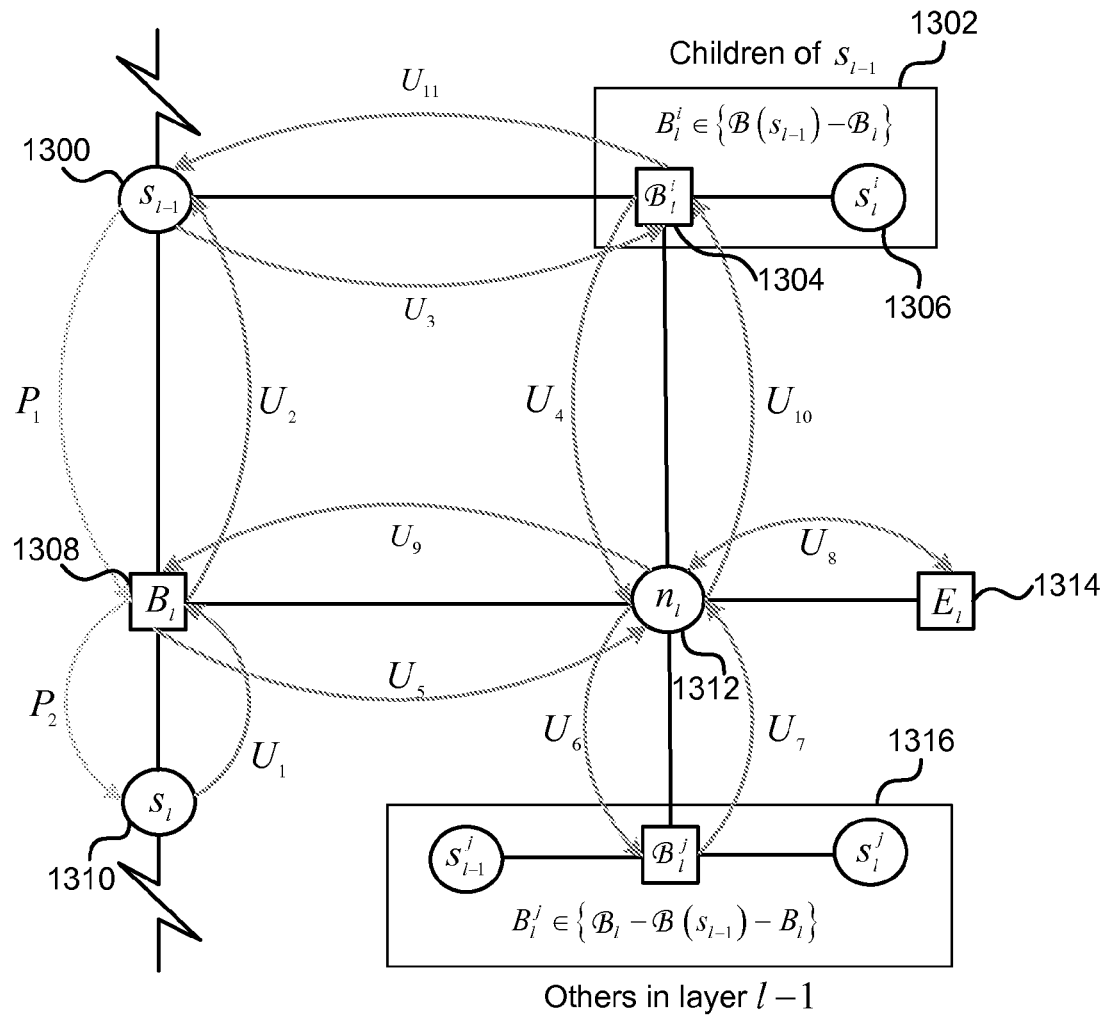
FIG. 13 is a schematic diagram of message passing on a graphical data structure in an example update.

The messages described below with reference to FIG. 13 are messages that may be used for a schedule of updates. In an embodiment the downward prediction process is optimized and the upward update pass is slower. This feature makes prediction fast and the model update a slower off-line process.

The messages described in FIG. 13 are members of a loop in the graph for a single update. The constituent nodes are updated by following a processing schedule. An example update path is:

1. Update $s_{l-1}$ 1300 via messages to B-factors that are children of $s_{l-1}$, keeping $n_l$ 1312 fixed: $U_1$, ($U_9$) $U_2$; $U_{10}$, $U_{11}$
2. Update $n_l$ using all B-factors connected to $n_l$: $U_3$, $U_4$ $P_l$; $U_5$, $U_6$, $U_7$, $U_8$
3. Update $s_{l-1}$ 1300 with new level noise: $U_9$, $U_2$; $U_{10}$, $U_{11}$ A single observation should affect each variable in the graph. In the prediction path, only the B-factors (such as 1308, 1304) in the path to the observation are updated. In an embodiment the update schedule does not update the whole tree but instead caches minimal updates in preparation for a new query at the B-factors. The update may be performed immediately or may be postponed.

Message $P_1$: $s_{l-1} \to B_l$

Applying the factor to variable rule described in (0.1) take the product of all the incoming messages to the s-variable as described with reference to FIG. 11. When l>2 in FIG. 13 the message can be described by:

$$m_{s_{l-1} \to B_l}(s_{l-1}) = m_{B_{l-1} \to s_{l-1}} \prod_{B_l^i \in \{\mathcal{B}(s_{l-1})-B_l\}} m_{B_l^i \to s_{l-1}}$$

In an example the very first observation the messages from the $B(s_{l-1})$ factors may be set to one leaving the B-factor messages from the parent. When l=1 at the top of the tree in FIG. 11 there is a special case involving the A and K factors. A represents all A-factors below $s_0$:

$$m_{s_0 \to A_1}(s) = m_{K \to s_0} \prod_{A_i \in \{A-A_1\}} m_{A_i \to s_0}$$

Where the message $m_{A_i \to s_0}$ represents messages from fellow siblings in the top level of the hierarchy. In an example a first top-down pass these messages may be set to one and $m_{K \to s0}$ is a Gaussian message which is given by (0.3).

When l=2:

$$m_{s_1 \to B_2}(s_1) = m_{A_1 \to s_1} \prod_{B_2^i \in \{\mathcal{B}(s_1)-B_2\}} m_{B_2^i \to s_1}$$

Where the B-factors represent the sibling factors that are the children of $s_1$. In an example the first observation the messages from $B(S_1)$ factors may be set to one, leaving just the A-factor message.

Message $P_2$:$B_l \to S_l$

The message $P_2$: $B_{l \to Sl}$ is a special case of the message $m_{K \to s_0}$. Both upstream variables can be integrate out using (0.2).

$$m_{B_l \to s_l}(s_l) = N(s_l; \mu_{s_{l-1} \to B_l} + \mu_{n_l \to B_l}, \sigma_{s_{l-1} \to B_l}^2 + \sigma_{n_l \to B_l}^2)$$

When l=1 there is a special case involving the A-factor message $m_0 \to A_l$:

$$m_{A_l \to s_l}(s_l) = N(s_l; \mu_{s_0 \to Al}, \sigma_{s_0 \to A_l}^2)$$

Message $U_l$: $s_l \to B_l$

Applying the variable to factor rule given by (0.2) when the score node is not the observed node (l<L):

$$m_{s_l \to B_l}(s_l) = \prod_{B_{l+1}^i \in \mathcal{B}(s_l)} m_{B_{l+1}^i \to s_l}$$

The product here is over B-factors from the next level down. In the example where l=L at the bottom of the graphical date structure shown in FIG. 11 at the observed node an extra message is included from the observation factor node H 1122:

$$m_{s_l \to B_l}(s_l) = m_{H \to s_L} \prod_{B_{l-1}^i \in \mathcal{B}(s_l)} m_{B_{l+1}^i \to s_l}$$

In an example where l=0 at the final update step a product is taken over the incoming messages to $s_0$:

$$m_{s_1 \to A_1}(s_1) = \prod_{B_2^i \in \mathcal{B}(s_1)} m_{B_2^i \to s_1}(s_1)$$

Message $U_2$: $B_l \to s_{l-1}$

The upcoming message from a child node updates the parent node and the level noise variable (see $U_5$):

$$m_{B_l \to s_l}(s_{l-1}) = N(s_{l-1}; \mu_{s_l \to B_l} - \mu_{n_l \to B_l}, \sigma_{s_l \to B_l} + \sigma_{n_l \to B_l}^2)$$

When l=1 the message involves the A factor nodes message $m_{A_l \to s_0}$ and so: $m_{A_l s_0}(s_0) = m_{s_l \to A_l}(s_0)$. Message $U_2$ is the basis for the message of $U_{11}$.

Message $U_3$: $s_{l-1} \to B_l^i \forall B_l^i \in \{\mathcal{B}(s_{l-1})-B_l\}$ This is a fan-out node message to each of the child B-factors of $s_{l-1}$ 1302:

$$m_{s_{l-1} \to B_l^i}(s_{l-1}) = m_{B_{l-1} \to s_{l-1}} \prod_{\tilde{B} \in \{\mathcal{B}(s_{l-1})-B_l^i\}} m_{B_{l-1} \to s_{l-1}} \forall B_l^i \in \{\mathcal{B}(s_{l-1}) - B_l\}$$

Similarly to $U_2$ message $U_5$ allocates residual credit to the level noise:

$$m_{B_l \to n_l}(n_l) = N(n_l; \mu_{s_{l-1} \to B_l} - \mu_{s_{l-1} \to B_l}, \sigma_{s_l \to B_l} + \sigma_{s_{l-1} \to B_l}^2)$$

Message $U_5$ is the basis for messages $U_4$ and $U_6$

Message $U_4$: $n_{l-1} \to B_l^j \forall B_l^j \in \{\mathcal{B}(d_{l-1}) - B_l\}$ Message $U_4$ is a collection of messages for a single $B_l \to n_l$. An outgoing message from $n_l$ takes their product. The relevant child score variable is no longer $s_l$ but $s_l^i$ defined here to be the child variable of the potentially many $B_l^i$ factors that are the children of $s_{l-1}$ but not including $s_{l-1}$ itself $$m_{B_l^i \to n_l}(n_l) = N(n_l; \mu_{s_l^i \to B_l^i} - \mu_{s_{l-1} \to B_l^i}, \sigma_{s_l^i \to B_l^i} + \sigma_{s_{l-1} \to B_l^i})$$
$$\forall B_l^i \in \{\mathcal{B}(s_{l-1}) - B_l\}$$

The messages are expressed in terms of the message $m_{s_l^i \to B_l^i}$ which are instances of message type $U_1$.

Message $U_6$: $n_l \to B_l^j \forall B_l^j \in \{\mathcal{B}(s_{l-1}) - B_l\}$

In an example the local update for $n_l$ can be transferred to and from all the other B-factors in the level (in conjunction with message $U_7$ below). This message is the broadcast set. Applying the variable to factor rule a product of all other incoming messages to the variable $n_l$ 1312 is computed. An identical message can be broadcast for each node $B_l^j$:

$$m_{n_l \to B_l^j}(n_l) = m_{E_l \to n_l} m_{B_l \to n_l} \prod_{B_l^i \in \{\mathcal{B}(s_{l-1}) - B_l^j\}} m_{B_l^i \to n_l} \forall B_l^j \in \{B_l - \mathcal{B}(s_{l-1}) - B_l\}$$

In an example these message can be replaced with a subset of messages in order to increase efficiency as long as the subset is of sufficient size.

Message $U_7$: $B_l^j \to n_l \forall B_l^j \in \{B_l - \mathcal{B}(s_{l-}) - B_l\}$ Message $U_7$ denotes a large number of messages from non-sibling B-factors to the level noise variable. The child integrated out is the child of the B-factor denoted $s_l^j$, the child variable of potentially very many $B_l^j$ factors in level that are not children of $s_{l-1}$. The parent score variable integrated out is not $s_{l-1}$ (as with $U_4$) but the parent of the B factor denoted here as $s_{l-1}^j$:

$$m_{B_l^j \to n_l}(n_l) = $$
$$N\left(n_l; \mu_{s_l^j \to B_l^j} - \mu_{s_{l-1}^j \to B_l^j}, \sigma_{s_l^j \to B_l^j}^2 + \sigma_{s_{l-1}^j \to B_l^j}^2\right) \forall B_l^j \in \{\mathcal{B}(s_{l-1}) - B_l\}$$

Messages $U_4$, $U_6$ and $U_7$ update $n_l$ 1312 with information from other observations cached in the B-factors of other paths in the tree.

Message $U_8$: $n_l \to E_l$

The distribution of a single variable is given by the product of all incoming messages from neighboring factors. To compute the posteriors at a particular variable a variable marginal can be computed. Message $U_8$ combines factors from each B-factor in the level:

$$m_{n_l \to E}(n_l) = \prod_{B_l^j \in \mathcal{B}_l} m_{B_l^j \to n_l}(n_l)$$

Message $U_9$: $n_l \to B_l$ and $U_{10}$: $n_l \to B_l^j \forall B_l^i \in \{\mathcal{B}(s_{l-1}) - B_l\}$ Applying (0.1) the product of all other incoming messages to variable $n_1$ 1312 can be computed. Message $U_9$ can be described as:

$$m_{n_l \to B_l}(n_l) = m_{E_l \to n_l} \prod_{B_l^i \in \{B_l - \mathcal{B}(s_{l-1}) - B_l\}} m_{B_l^i \to n_l}(n_l) \prod_{B_l^j \in \{B_l - \mathcal{B}(s_{l-1}) - B_l\}} m_{B_l^j \to n_l}(n_l)$$

Message $U_{10}$ can be described as:

$$m_{n_l \to B_l^j}(n_l) = m_{E_l \to n_l} m_{B_l \to n_l} \prod_{B_l^i \in \{B_l - \mathcal{B}(s_{l-1}) - B_l^j\}} m_{B \to n_l} \forall B_l^i \in \{B_l - \mathcal{B}(s_{l-1}) - B_l\}$$

Message $U_{11}$ is a collection of messages of the type described in $U_2$. Any outgoing message from $s_{l-1}$ will need to take their product. is integrated over $n_l$ and the relevant child score variable is no longer $s_l$ as above but defined here to be the child variable $s_l^i$ of potentially many $B_l^i$ that are children of $s_{l-1}$ but not including itself:

$$m_{B_l^i \to n_l}(s_{l-1}) = N(s_{l-1}; \mu_{s_l^i \to B_l^i} - \mu_{n_l \to B_l^i}, \sigma_{s_l^i \to B_l^i} + \sigma_{n_l \to B_l^i}^2)$$
$$\forall B_l^i \in \{\mathcal{B}(s_{l-1}) - B_l\}$$

These are expressed in terms of message type $U_1$ arriving at a sibling score.

The message passing algorithm describes the level dependent Gaussian noise. In an example where the levels in the graphical data structure denote URL prefix levels the scores may be expected to decrease the lower the level in the tree. In other examples it may be the case that the score increases.

Figure 14:
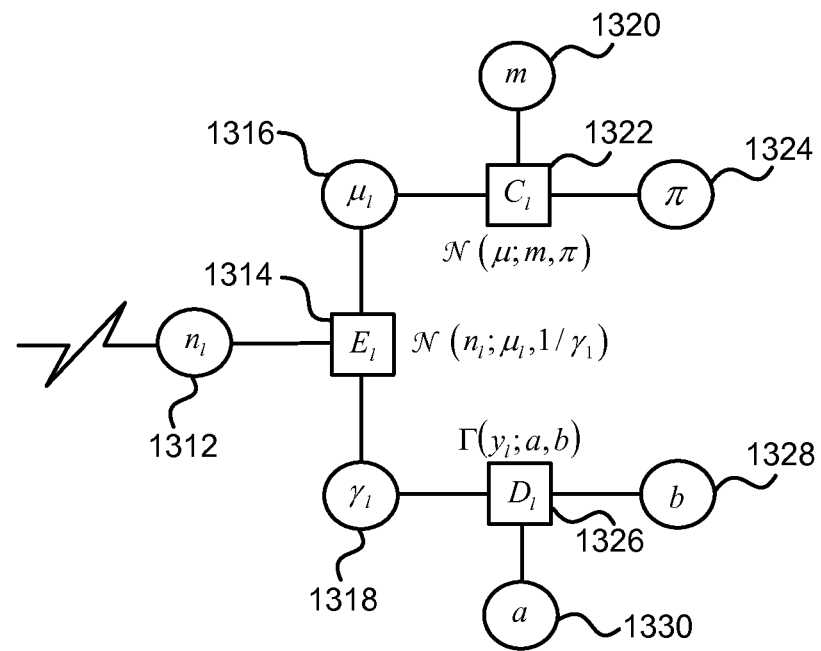
FIG. 14 is a schematic diagram of a graphical data structure for a Gaussian level noise component.

FIG. 14 is a schematic diagram of a graphical data structure for a Gaussian level noise component which is a subset of the factor graph shown in FIG. 11. In the example in FIG. 14 there are three factor nodes $E_l$ 1314, $C_l$ 1322 and $D_l$ 1326; three variable nodes $n_l$ 1312, $\mu_l$ 1316 and $\gamma_l$ 1318; and four observed events a 1330, b 1328, $\pi$ 1324 and m 1320 and messages are passed between the variable nodes and factor nodes as now described (subscripts have been dropped where the message is unambiguous):

Message C→μ

The message between C 1322 and μ 1316 is simply the function held at the factor: $m_{c \to \mu}(\mu) = N(\mu; m, \pi)$ Message D→γ

Similarly the outgoing message at D 1326 to γ 1318 is simply the function held at the factor: $m_{D \to \gamma}(\gamma) = N(\gamma; a, b)$.

Message E→n

Given the mean μ 1316 and the precision γ 1318 the variable 1312 n representing the noise level receives the following message from the Gaussian factor E 1314.

$$m_{E \to n}(n) = \frac{1}{m_{n \to E}(n)} proj\left[\int \Gamma(\gamma; a, b) N(n; \mu_n, \pi_n^{-1}) k\right] d\gamma$$

Where $$\pi_n = \frac{\gamma}{1 + \gamma\pi} \frac{1}{\sigma_{n \to E}^2}, \mu_n = \left(\frac{m\gamma}{1 + \gamma\pi} + \frac{\mu_{n \to E}}{\sigma_{n \to E}^2}\right)\frac{1}{\pi_n},$$
$$k = N(\mu_{n \to E}; m, \pi^{-1} + \gamma^{-1} + \sigma_{n \to E}^2)$$

The incoming message $m_{n \to E}$ is defined above.

Message E→μ

The message E→μ is similar to the one above:

$$m_{E \to \mu}(\mu) = \frac{1}{m_{\mu \to E}(\mu)} proj\left[\int \Gamma(\gamma; a, b) N(\mu; \mu_\mu, \pi_\mu^{-1}) k\right] d\gamma$$

-continued

Where $$\pi_\mu = \frac{\gamma}{1+\gamma\pi}\frac{1}{\sigma^2_{n\to E}}, \mu_\mu = \left(\frac{m\gamma}{1+\gamma\pi} + \frac{\mu_{n\to E}}{\sigma^2_{n\to E}}\right)\frac{1}{\pi_\mu},$$

$$k = N(\mu_{n\to E}; m, \pi^{-1} + \gamma^{-1} + \sigma^2_{n\to E})$$

Message E→γ

Message E→γ is defined as:

$$m_{E\to\gamma}(\gamma) = \frac{1}{m_{\gamma\to E}(\gamma)} proj\left[\int \Gamma(\gamma; a, b) N(\mu_{n\to E}; m\cdot\pi + \gamma^{-1} + \sigma^2_{n\to E})\right]$$

The proj operator in this message needs to map a gamma distribution. The three other components in the calculation of this message have all been assimilated into the one term. The upward message also needs messages $m_{n\to E}(n)$ defined above.

Having passed all the relevant messages the marginal at each node that has received a new message as a result of the observation can be computed in the same way as the marginal is computed for message $U_8$ above.

Figure 15:
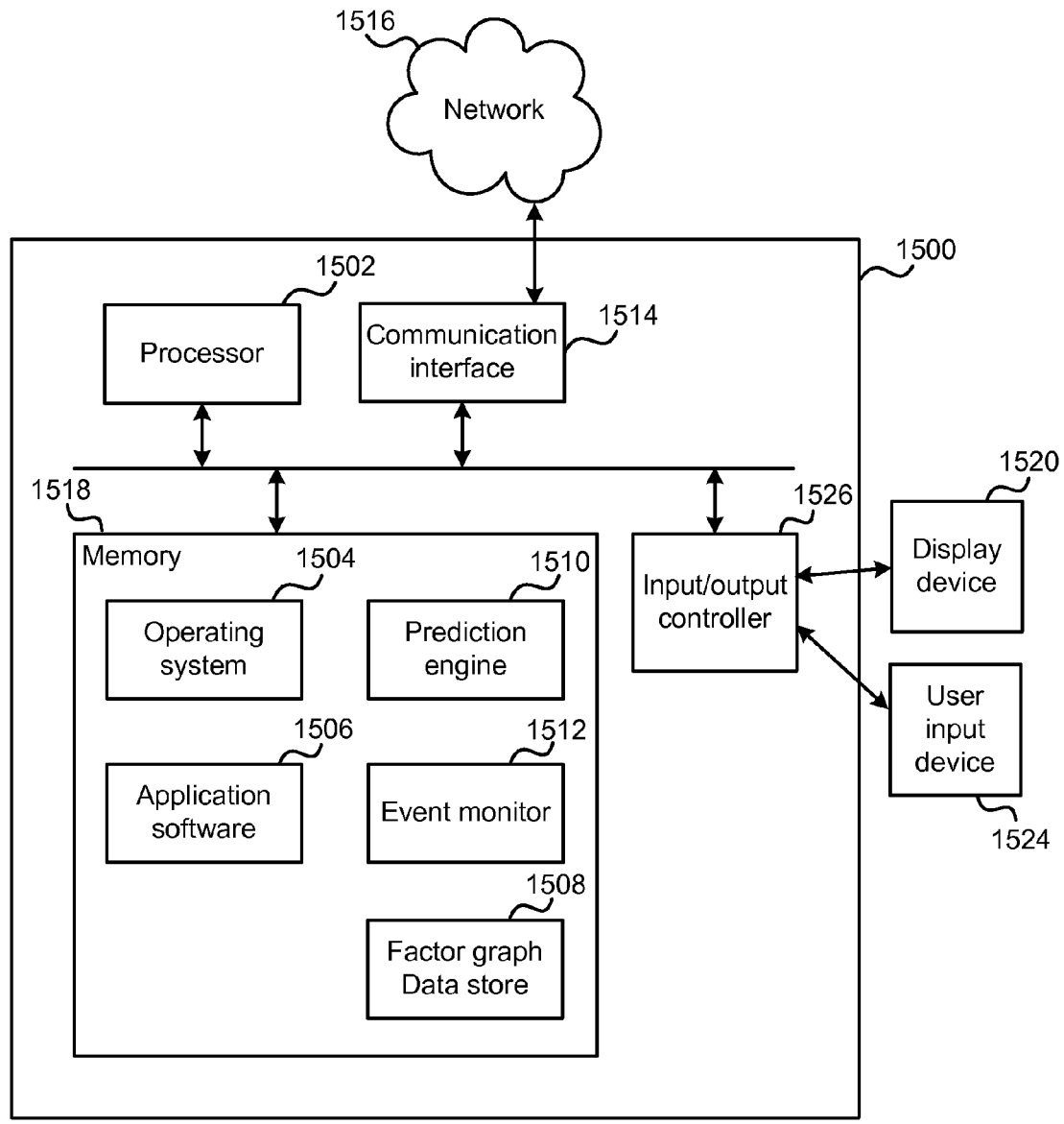
FIG. 15 illustrates an exemplary computing-based device in which embodiments of a control system may be implemented.

FIG. 15 illustrates various components of an exemplary computing-based device 1500 which may be implemented as any form of a computing and/or electronic device, and in which embodiments of an event prediction system may be implemented.

The computing-based device 1500 comprises a communication interface 1514 which enables it to communicate with one or more other entities over a communications network 1516. For example, the other entities may be databases, apparatus to be controlled or other entities.

Computing-based device 1500 comprises one or more processors 1502 which may be microprocessors, controllers or any other suitable type of processors for processing computing executable instructions to control the operation of the device in order to predict events and use those predictions to control an apparatus. Platform software comprising an operating system 1504 or any other suitable platform software may be provided at the computing-based device to enable application software 1506 to be executed on the device. A prediction engine 1510 is provided and is arranged to predict events using hierarchical event features. An event monitor 1512 is provided to observe and monitor event outcomes and features of events as they occur. A factor graph data store 1508 is provided to store graphical data structures used by the prediction engine 1510.

The computer executable instructions may be provided using any computer-readable media that is accessible by computing based device 1500. Computer-readable media may include, for example, computer storage media such as memory 1518 and communications media. Computer storage media, such as memory 1518, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (memory 1518) is shown within the computing-based device 1500 it will be appreciated that the storage may be distributed or located remotely and accessed via a network or other communication link (e.g. using communication interface 1514).

The computing-based device 1500 also comprises an input/output controller 1526 arranged to output display information to a display device 1520 which may be separate from or integral to the computing-based device 1500. The display information may provide a graphical user interface. The input/output controller 1526 is also arranged to receive and process input from one or more devices, such as a user input device 1524 (e.g. a mouse or a keyboard). In an embodiment the display device 1520 may also act as the user input device 1524 if it is a touch sensitive display device. The input/output controller 1526 may also output data to devices other than the display device, e.g. a locally connected printing device.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method comprising:
monitoring, by one or more processors, a stream of user click events occurring at an apparatus, each event being associated with a plurality of features describing the event, at least some of the plurality of features being related in a hierarchical manner;
creating a graphical data structure comprising variable nodes connected by edges, the plurality of features describing the event being represented by variable nodes and the variable nodes being connected such that sequences of connected variable nodes represent the hierarchical relations between features, each variable node being associated with statistics describing a probability distribution representing a latent event score;
arranging a training engine to update the statistics for at least one of the variable nodes on the basis of the monitoring; and
predicting an event related to a simultaneous scope search using the graphical data structure.

2. The computer-implemented method of claim 1, wherein the statistics for the at least one of the variable nodes are updated by using a Bayesian machine learning process.

3. The computer-implemented method of claim 1, wherein the statistics for the at least one of the variable nodes are updated by propagating the latent event score along the sequences of variable nodes which represent the hierarchical relations.

4. The computer-implemented method of claim 1, wherein creating the graphical data structure comprises creating a tree-based graphical data structure comprising layers of parent and child variable nodes.

5. The computer-implemented method of claim 4, wherein arranging the training engine to update the statistics comprises enabling a child variable node to inherit a noisy version of the latent event score of a parent variable node.

6. The computer-implemented method of claim 4, wherein creating the graphical data structure further comprises forming a level noise variable node at each layer of variable nodes.

7. The computer-implemented method of claim 1, wherein creating the graphical data structure comprises incorporating factor nodes as computational units into the graphical data structure, each factor node having at least one associated computational message.

8. The computer-implemented method of claim 7, wherein the statistics for the at least one of the variable nodes are updated by using messaging passing that includes computing the computational messages and passing results of the computations to variable nodes in the graphical data structure.

9. The computer-implemented method 1, wherein at least some of the plurality of features for one or more of the events are not hierarchically related and the graphical data structure is created such that the graphical data structure comprises an observation component including a plurality of variable nodes representing weights associated with the features that are not hierarchically related.

10. The computer-implemented method of claim 9, wherein the latent event scores act as a bias on an output of the observation component.

11. The computer-implemented method of claim 1, wherein the plurality of features that are related in a hierarchical manner are uniform resource locator prefix levels.

12. The computer-implemented method of claim 1, wherein the stream of events comprises presentations of search results at a user interface and associated user inputs.

13. A system comprising:
one or more processors;
memory;
a monitor component maintained at least in part in the memory and executed at least in part by the one or more processors to monitor a stream of user click events occurring at the system, each event being associated with a plurality of features describing the event, at least some of the plurality of features being related in a hierarchical manner;
a graphical data component maintained at least in part in the memory and executed at least in part by the one or more processors to create a graphical data structure comprising layers of parent and child variable nodes connected by edges, weights associated with the features being represented by variable nodes and the variable nodes being connected such that sequences of connected variable nodes represent the hierarchical relations between features, each variable node being associated with statistics describing a probability distribution representing a latent event score;
a training engine maintained at least in part in the memory and executed at least in part by the one or more processors to update the statistics for at least one of the variable nodes on the basis of the monitoring; and
a prediction engine maintained at least in part in the memory and executed at least in part by the one or more processors to predict an event related to a simultaneous scope search using the graphical data structure.

14. The system of claim 13, wherein the statistics for the at least one of the variable nodes are updated by enabling a child variable node to inherit a noisy version of the latent event score of a parent variable node of the child node.

15. The system of claim 14, wherein the noisy version is specified using the level noise variable node in the layer of the parent variable node.

16. The system of claim 13, wherein the graphical data structure further comprises a level noise variable node at each layer of variable nodes.

17. One or more computer storage media storing computer-readable instructions that, when executed, instruct one or more processors to perform operations comprising:

monitoring a stream of user search and click events, each event being associated with a plurality of features describing the event, at least some of the plurality of features being universal resource locator prefix levels of a document;

creating a graphical data structure comprising layers of parent and child variable nodes connected by edges, weights associated with the plurality of features being represented by variable nodes and at least some of the variable nodes being connected such that sequences of connected variable nodes represent the universal resource locator prefix levels of the document, each variable node being associated with statistics describing a probability distribution representing a latent event score;

updating the statistics for at least one of the variable nodes on the basis of the monitoring; and predicting a user input event related to a simultaneous scope search using the graphical data structure.

18. The one or more computer storage media of claim 17, wherein the statistics for the at least one of the variable nodes is updated by using a Bayesian machine learning process such that latent event score information is propagated along the sequences of variable nodes which represent the universal resource locator prefix levels of the document.

19. The one or more computer storage media of claim 17, wherein at least some of the features are content features of the document and the graphical data structure is stored such that weights associated with the content features are stored at content variable nodes.

20. The one or more computer storage media of claim 19, wherein the latent event scores are able to act as a bias on the content variable nodes.

* * * * *